United States Patent Office 2,771,445
Patented Nov. 20, 1956

2,771,445

PROCESS FOR BREAKING PETROLEUM EMULSIONS EMPLOYING GLUCONIC ACID SALTS OF OXYALKYLATED AMINE-MODIFIED THERMOPLASTIC PHENOL-ALDEHYDE RESINS

Melvin De Groote, University City, Mo., assignor to Petrolite Corporation, Wilmington, Del., a corporation of Delaware No Drawing. Application January 26, 1953,
Serial No. 333,386

36 Claims. (Cl. 252—341)

The present invention is a continuation-in-part of my five co-pending applications, Serial No. 288,742, filed May 19, 1952, now abandoned; Serial No. 296,083, filed June 27, 1952, now U. S. Patent 2,679,484; Serial No. 301,803, filed July 30, 1952, now Patent No. 2,743,251; Serial No. 310,551, filed September 19, 1952, now U. S. Patent 2,695,887, and Serial No. 329,482, filed January 2, 1953.

My invention provides an economical and rapid process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification under the conditions just mentioned are of significant value in removing impurities, particularly inorganic salts, from pipeline oil.

My aforementioned co-pending application, Serial No. 310,551, filed September 19, 1952, is concerned with a process for breaking petroleum emulsions of the water-in-oil type characterized by subjecting the emulsion to the action of a demulsifier including certain oxyalkylated condensation products of certain phenol-aldehyde resins, basic non-hydroxylated secondary monoamines and formaldehyde therein described.

My present invention is concerned with demulsification which involves the use of the aforementioned amino resin condensate in the form of a gluconic acid salt, i. e., a form in which all or part of the basic nitrogen atoms are neutralized with gluconic acid, i. e., converted into the salt of gluconic acid.

Needless to say, all that is required is to prepare the oxyalkylated amine resin condensates in the manner described in the aforementioned co-pending applications, and then neutralize with gluconic acid which, for practical purposes is as simple as analogous inorganic reactions.

As far as the use of the herein described products go for purpose of resolution of petroleum emulsions of the water-in-oil type, I particularly prefer to use the gluconic acid salt of those members which have sufficient hydrophile character to meet at least the test set forth in U. S. Patent No. 2,499,368, dated March 7, 1950, to De Groote et al. In said patent such test for emulsification using a water-insoluble solvent, generally xylene, is described as an index of surface activity.

The present invention involves the surface-activity of the gluconic acid salts, i. e., either where only one basic amino nitrogen atom is neutralized or where all basic amino nitrogen atoms are neutralized. Such gluconic acid salts may not necessarily be xylene-soluble. If such compounds are not xylene-soluble the obvious chemical equivalent or equivalent chemical test can be made by simply using some suitable solvent, preferably a water-soluble solvent such as ethylene glycol diethylether or a low molal alcohol, or a mixture to dissolve the appropriate product being examined and then mix with the equal weight of xylene, followed by addition of water. Such test is obviously the same for the reason that there will be two phases on vigorous shaking and surface activity makes its presence manifest. It is understood the reference in the hereto appended claims as to the use of xylene in the emulsification test includes such obvious variant.

For convenience, what is said hereinafter will be divided into seven parts:

Part 1 is concerned with the general structure of the amine-modified resins which after oxyalkylation are converted to the gluconic acid salt;

Part 2 is concerned with the phenol-aldehyde resin which is subjected to modification by condensation reaction to yield the amine-modified resin;

Part 3 is concerned with appropriate basic secondary amines free from a hydroxyl radical which may be employed in the preparation of the herein described amine-modified resins;

Part 4 is concerned with reactions involving the resin, the amine, and formaldehyde to produce specific products or compounds which are then subjected to oxyalkylation;

Part 5 is concerned with the oxyalkylation of the products described in Part 4 preceding;

Part 6 is concerned with the conversion of the basic oxyalkylated derivatives described in Part 5, preceding; in the corresponding salt of gluconic acid;

Part 7 is concerned with the resolution of petroleum emulsions of the water-in-oil type by means of the previously described chemical compounds or reaction products in the form of gluconic acid salts.

PART 1

The compounds used in accordance with the present invention are the gluconic acid salts of the products obtained by oxyalkylating the amine resin condensates described in applications Serial Nos. 288,742 and 296,083, to which reference is made for a discussion of the general structure of such resins.

These resins may be exemplified by an idealized formula which may, in part, be an over-simplification in an effort to present certain resin structure. Such formula would be the following:

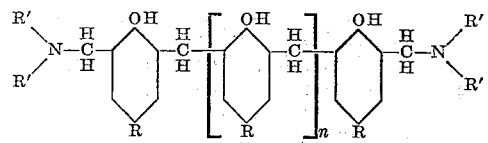

in which R represents an aliphatic hydrocarbon substituent generally having four and not over 18 carbon atoms but most preferably not over 14 carbon atoms, and $n$ generally is a small whole number varying from 1 to 4. In the resin structure it is shown as being derived from formaldehyde although obviously other aldehydes are equally satisfactory. The amine residue in the above structure is derived from a basic amine, and usually a strongly basic amine, and may be indicated thus:

in which R' represents any appropriate hydrocarbon radical, such as an alkyl, alicyclic, arylalkyl radical, etc., free from hydroxyl radicals. The only limitation is that the radical should not be a negative radical, which considerably reduces the basicity of the amine, such as an aryl radical or an acyl radical. Needless to say, the two occurrences of R' may jointly represent a single divalent radical instead of two monovalent radicals. This is illustrated by morpholine and piperidine. The introduction of two such amino radicals into a comparatively small resin molecule, for instance, one having 3 to 6 phenolic nuclei as specified, alters the resultant product in a number of ways. In the first place, a basic nitrogen atom, of course, adds a hydrophile effect; in the second place, depending on the size of the radical R', there may be a counter-balancing hydrophobe effect or one in which the hydrophobe effect more than counter-balances the hydrophile effect of the nitrogen atom. Finally, in such cases where R' contains one or more oxygen atoms, another effect is introduced, particularly another hydrophile effect.

The resins employed as raw materials in the instant procedure are characterized by the presence of an aliphatic radical in the ortho or para position, i. e., the phenols themselves are difunctional phenols.

The resins herein employed contain only two terminal groups which are reactive to formaldehyde, i. e., they are difunctional from the standpoint of methylol-forming reactions. As is well known, although one may start with difunctional phenols, and depending on the procedure employed, one may obtain cross-linking which indicates that one or more of the phenolic nuclei have been converted from a difunctional radical to a trifunctional radical, or in terms of the resin, the molecule as a whole has a methylol-forming reactivity greater than 2. Such shift can take place after the resin has been formed or during resin formation. Briefly, an example is simply where an alkyl radical, such as methyl, ethyl, propyl, butyl, or the like, shifts from an ortho position to a meta position, or from a para position to a meta position. For instance, in the case of phenol-aldehyde varnish resins, one may prepare at least some in which the resins, instead of having only two points of reaction can have three, and possibly more points of reaction, with formaldehyde, or any other reactant which tends to form a methylol or substituted methylol group.

The resins herein employed are soluble in a non-oxygenated hydrocarbon solvent, such as benzene or xylene.

The resins herein employed as raw materials must be comparatively low molal products having on the average 3 to 6 nuclei per resin molecule.

The condensation products here obtained, whether in the form of the free base or the salt, do not go over to the insoluble stage on heating. The condensation product obtained according to the present invention is heat-stable and, in fact, one of its outstanding qualities is that it can be subjected to oxyalkylation, particularly oxyethylation or oxypropylation, under conventional conditions, i. e., presence of an alkaline catalyst, for example, but in any event at a temperature above 100° C. without becoming an insoluble mass.

What has been previously said in regard to heat stability, particularly when employed as a reactant for preparation of derivatives, is still important from the standpoint of manufacture of the condensation products themselves insofar that in the condensation process employed in preparing the compounds described subsequently in detail, there is no objection to the employing of a temperature above the boiling point of water. As a matter of fact, all the examples included subsequently employ temperatures going up to 140° C. to 150° C.

What is said above deserves further amplification at this point for the reason that it may shorten what is said subsequently in regard to the production of the herein described condensation products. Since formaldehyde generally is employed economically in an aqueous phase (30% to 40% solution, for example) it is necessary to have manufacturing procedure which will allow reactions to take place at the interface of the two immiscible liquids, to wit, the formaldehyde solution and the resin solution, on the assumption that generally the amine will dissolve in one phase or the other. Although reactions of the kind herein described will begin at least at comparatively low temperatures, for instance, 30° C., 40° C., or 50° C., yet the reaction does not go to completion except by the use of the higher temperatures. The use of higher temperatures means, of course, that the condensation product obtained at the end of the reaction must not be heat-reactive. Of course, one can add an oxygenated solvent such as alcohol, dioxane, various ethers of glycols, or the like, and produce a homogeneous phase. If this latter procedure is employed in preparing the herein described condensations it is purely a matter of convenience, but whether it is or not, ultimately the temperature must still pass within the zone indicated elsewhere, i. e., somewhere above the boiling point of water unless some obvious equivalent procedure is used.

Any reference, as in the hereto appended claims, to the procedure employed in the process employed in the manufacture of the condensation product is not intended to limit the method or order in which the reactants are added, commingled or reacted. The procedure has been referred to as a condensation process for obvious reasons. As pointed out elsewhere it is my preference to dissolve the resin in a suitable solvent, add the amine, and then add the formaldehyde as a 37% solution. However, all three reactants can be added in any order. I am inclined to believe that in the presence of a basic catalyst, such as the amine employed, that the formaldehyde produces methylol groups attached to the phenolic nuclei which, in turn, react with the amine. It would be immaterial, of course, if the formaldehyde reacted with the amine so as to introduce a methylol group attached to nitrogen which, in turn, would react with the resin molecule. Also, it would be immaterial if both types of compounds were formed which reacted with each other with the evolution of a mole of formaldehyde available for further reaction. Furthermore, a reaction could take place in which three different molecules are simultaneously involved although, for theoretical reasons, that is less likely. What is said herein in this respect is simply by way of explanation to avoid any limitation in regard to the appended claims.

PART 2

It is well known that one can readily purchase on the open market, or prepare, fusible, organic solvent-soluble, water-insoluble resin polymers of a composition approximated in an idealized form by the formula

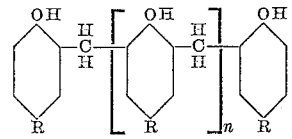

In the above formula $n$ represents a small whole number varying from 1 to 6, 7 or 8, or more, up to probably 10 or 12 units, particularly when the resin is subjected to heating under a vacuum as described in the literature. A limited sub-genus is in the instance of low molecular weight polymers where the total number of phenol nuclei varies from 3 to 6, i. e., $n$ varies from 1 to 4; R represents an aliphatic hydrocarbon substituent, generally an alkyl radical having from 4 to 15 carbon atoms, such as a butyl, amyl, hexyl, decyl or dodecyl radical. Where the divalent bridge radical is shown as being derived from formaldehyde it may, of course, be derived from any other reactive aldehyde having 8 carbon atoms or less.

The resins herein employed as raw materials must be soluble in a nonoxygenated solvent, such as benzene or xylene. This presents no problem insofar that all that is required is to make a solubility test on commercially available resins, or else prepare resins which are xylene or benzene-soluble as described in aforementioned U. S. Patent No. 2,499,365, or in U. S. Patent No. 2,499,368, dated March 7, 1950, to De Groote and Keiser.

If one selected a resin of the kind just described previously and reacted approximately one mole of the resin with two moles of formaldehyde and two moles of a basic nonhydroxylated secondary amine as specified, following the same idealized over-simplification previously referred to, the resultant product might be illustrated thus:

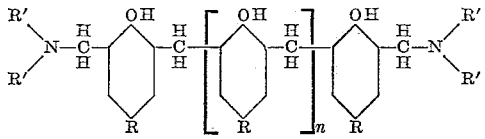

The basic nonhydroxylated amine may be designed thus:

In conducting reactions of this kind one does not necessarily obtain a hundred percent yield for obvious reasons. Certain side reactions may take place. For instance, 2 moles of amine may combine with one mole of the aldehyde, or only one mole of the amine may combine with the resin molecule, or even to a very slight extent, if at all, 2 resin units may combine without any amine in the reaction product, as indicated in the following formulas:

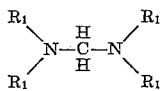

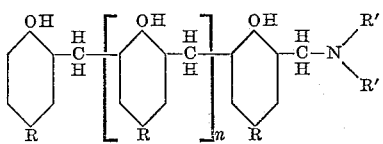

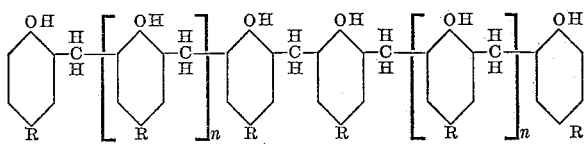

As has been pointed out previously, as far as the resin unit goes one can use a mole of aldehyde other than formaldehyde, such as acetaldehyde, propionaldehyde or butyraldehyde. The resin unit may be exemplified thus:

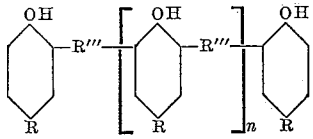

in which R''' is the divalent radical obtained from the particular aldehyde employed to form the resin. For reasons which are obvious the condensation product obtained appears to be described best in terms of the method of manufacture.

As previously stated the preparation of resins, the kind herein employed as reactants, is wel known. See previously mentioned U. S. Patent 2,499,368. Resins can be made using an acid catalyst or basic catalyst or a catalyst having neither acid nor basic properties in the ordinary sense or without any catalyst at all. It is preferable that the resins employed be substantially neutral. In other words, if prepared by using a strong acid as a catalyst, such strong acid should be neutralized. Similarly, if a strong base is used as a catalyst it is preferable that the base be neutralized although I have found that sometimes the reaction described proceeded more rapidly in the presence of a small amount of a free base. The amount may be as small as a 200th of a percent and as much as a few 10ths of a percent. Sometimes moderate increase in caustic soda and caustic potash may be used. However, the most desirable procedure in practically every case is to have the resin neutral.

In preparing resins one does not get a single polymer, i. e., one having just 3 units, or just 4 units, or just 5 units, or just 6 units, etc. It is usually a mixture; for instance, one approximating 4 phenolic nuclei will have some trimer and pentamer present. Thus, the molecular weight may be such that it corresponds to a fractional value for $n$ as, for example, 3.5, 4.5 or 5.2.

In the actual manufacture of the resins I found no reason for using other than those which are lowest in price and most readily available commercially. For purposes of convenience suitable resins are characterized in the following table:

TABLE I

| Example number | R | Position of R | R''' derived from— | $n$ | Mol. wt. of resin molecule (based on $n+2$) |
|---|---|---|---|---|---|
| 1a | Phenyl | Para | Formaldehyde | 3.5 | 992.5 |
| 2a | Tertiary butyl | do | do | 3.5 | 882.5 |
| 3a | Secondary butyl | Ortho | do | 3.5 | 882.5 |
| 4a | Cyclo-hexyl | Para | do | 3.5 | 1,025.5 |
| 5a | Tertiary amyl | do | do | 3.5 | 959.5 |
| 6a | Mixed secondary and tertiary amyl | Ortho | do | 3.5 | 805.5 |
| 7a | Propyl | Para | do | 3.5 | 805.5 |
| 8a | Tertiary hexyl | do | do | 3.5 | 1,036.5 |
| 9a | Octyl | do | do | 3.5 | 1,190.5 |
| 10a | Nonyl | do | do | 3.5 | 1,267.5 |
| 11a | Decyl | do | do | 3.5 | 1,344.5 |
| 12a | Dodecyl | do | do | 3.5 | 1,498.5 |
| 13a | Tertiary butyl | do | Acetaldehyde | 3.5 | 945.5 |
| 14a | Tertiary amyl | do | do | 3.5 | 1,022.5 |
| 15a | Nonyl | do | do | 3.5 | 1,330.5 |
| 16a | Tertiary butyl | do | Butyraldehyde | 3.5 | 1,071.5 |
| 17a | Tertiary amyl | do | do | 3.5 | 1,148.5 |
| 18a | Nonyl | do | do | 3.5 | 1,456.5 |
| 19a | Tertiary butyl | do | Propionaldehyde | 3.5 | 1,008.5 |
| 20a | Tertiary amyl | do | do | 3.5 | 1,085.5 |
| 21a | Nonyl | do | do | 3.5 | 1,393.5 |
| 22a | Tertiary butyl | do | Formaldehyde | 4.2 | 996.6 |
| 23a | Tertiary amyl | do | do | 4.2 | 1,083.4 |
| 24a | Nonyl | do | do | 4.2 | 1,430.6 |
| 25a | Tertiary butyl | do | do | 4.8 | 1,094.4 |
| 26a | Tertiary amyl | do | do | 4.8 | 1,189.6 |
| 27a | Nonyl | do | do | 4.8 | 1,570.4 |
| 28a | Tertiary amyl | do | do | 1.5 | 604.0 |
| 29a | Cyclo-hexyl | do | do | 1.5 | 646.0 |
| 30a | Hexyl | do | do | 1.5 | 653.0 |
| 31a | do | do | Acetaldehyde | 1.5 | 688.0 |
| 32a | Octyl | do | do | 1.5 | 786.0 |
| 33a | Nonyl | do | do | 1.5 | 835.0 |
| 34a | Octyl | do | Butyraldehyde | 2.0 | 986.0 |
| 35a | Nonyl | do | do | 2.0 | 1,028.0 |
| 36a | Amyl | do | do | 2.0 | 860.0 |
| 37a | Butyl | do | Formaldehyde | 2.0 | 636.0 |
| 38a | Amyl | do | do | 2.0 | 692.0 |
| 39a | Hexyl | do | do | 2.0 | 748.0 |
| 40a | Cyclo-hexyl | do | do | 2.0 | 740.0 |

PART 3

As has been pointed out previously, the amine herein employed as a reactant is a basic secondary monoamine, and preferably a strongly basic secondary monoamine, free from hydroxyl groups whose composition is indicated thus:

in which R' represents a monovalent alkyl, alicyclic, arylalkyl radical and may be heterocyclic in a few instances as in the case of piperidine and a secondary amine derived from furfurylamine by methylation or ethylation, or a similar procedure.

Another example of a heterocyclic amine is, of course, morpholine.

The secondary amines most readily available are, of course, amines such as dimethylamine, methylethylamine, diethylamine, dipropylamine, ethylpropylamine, dibutylamine, diamylamine, dihexylamine, dioctylamine, and dinonylamine. Other amines include bis(1,3-dimethylbutyl)amine. There are, of course, a variety of primary amines which can be reacted with an alkylating agent such as dimethyl sulfate, diethyl sulfate, an alkyl bromide, an ester of sulfonic acid, etc., to produce suitable amines within the herein specified limitations. For example, one can methylate alpha-methylbenzylamine, or benzylamine itself, to produce a suitable reactant. Needless to say, one can use secondary amines, such as dicyclohexylamine, dibutylamine or amines containing one cyclohexyl group and one alkyl group, or one benzyl group and one alkyl group, such as ethylcyclohexyl amine, ethylbenzylamine, etc.

Another class of amines which are particularly desirable for the reason that they introduce a definite hydrophile effect by virtue of an ether linkage, or repetitious ether linkage, are certain basic polyether amines of the formula

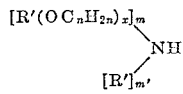

in which $x$ is a small whole number having a value of 1 or more, and may be as much as 10 or 12; $n$ is an integer having a value of 2 to 4, inclusive; $m$ represents the numeral 1 to 2; and $m'$ represents a number 0 to 1, with the proviso that the sum of $m$ plus $m'$ equals 2; and $R'$ has its prior significance, particularly as a hydrocarbon radical.

The preparation of such amines has been described in the literature and particularly in two United States patents, to wit, U. S. Nos. 2,325,514, dated July 27, 1943, to Hester, and 2,355,337, dated August 8, 1944, to Spence. The latter patent describes typical haloalkyl ethers such as $$CH_3OC_2H_4Cl$$

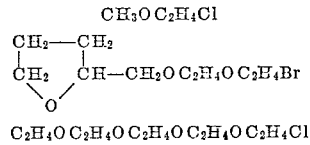

$$C_2H_4OC_2H_4OC_2H_4OC_2H_4OC_2H_4Cl$$

Such haloalkyl ethers can react with ammonia, or with a primary amine such as methylamine, ethylamine, cyclohexylamine, etc., to produce a secondary amine of the kind above described, in which one of the groups attached to nitrogen is typified by $R'$. Such haloalkyl ethers also can be reacted with ammonia to give secondary amines as described in the first of the two patents mentioned immediately preceding. Compounds so obtained are exemplified by $$(C_2H_4OC_2H_4OC_2H_4)_2NH$$

$$(C_8H_{17}OC_2H_4OC_2H_4OC_2H_4)_2NH$$

$$(C_4H_9OCH_2CH(CH_3)O(CH_3)CHCH_2)_2NH$$

$$(CH_3OCH_2CH_2OCH_2CH_2OCH_2CH_2)_2NH$$

$$(CH_3OCH_2CH_2CH_2CH_2CH_2CH_2)_2NH$$

Other somewhat similar secondary amines are those of the composition

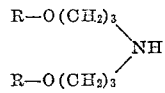

as described in U. S. Patent No. 2,375,659, dated May 8, 1945, to Jones et al. In the above formula R may be methyl, ethyl, propyl, amyl, octyl, etc.

Other amines can be obtained from products which are sold in the open market, such as may be obtained by alkylation of cyclohexylmethylamine or the alkylation of similar primary amines, or for that matter, amines of the kind described in U. S. Patent No. 2,482,546, dated September 20, 1949, to Kaszuba, provided there is no negative group or halogen attached to the phenolic nucleus. Examples include the following: beta-phenoxyethylamine, gamma-phenoxypropylamine, beta-phenoxy-alpha-methylethylamine, and beta-phenoxypropylamine.

Other suitable amines are the kind described in British Patent No. 456,517 and may be illustrated by $$C_{12}H_{25}-O-CH_2-CH_2-O-CH_2-CH_2-NH-CH_3$$

PART 4

The products obtained by the herein described processes employed in the manufacture of the condensation product represent cogeneric mixtures which are the result of a condensation reaction or reactions. Since the resin molecule cannot be defined satisfactorily by formula, although it may be so illustrated in an idealized simplification, it is difficult to actually depict the final product of the cogeneric mixture except in terms of the process itself. The condensation of the resin, the amine and formaldehyde is described in detail in applications Serial Nos. 288,742 and 296,083, and reference is made to those applications for a discussion of the factors involved.

Little more need be said as to the actual procedure employed for the preparation of the herein described condensation products. The following example will serve by way of illustration:

Example 1b

The phenol-aldehyde resin is the one that has been identified previously as Example 2a. It was obtained from a para-tertiary butylphenol and formaldehyde. The resin was prepared using an acid catalyst which was completely neutralized at the end of the reaction. The molecular weight of the resin was 882.5. This corresponded to an average of about 3½ phenolic nuclei, as the value for $n$ which excludes the two external nuclei, i. e., the resin was largely a mixture having 3 nuclei and 4 nuclei, excluding the two external nuclei or 5 and 6 overall nuclei. The resin so obtained in a neutral state had a light amber color.

882 grams of the resin identified as 2a, preceding, were powdered and mixed with an equal weight of xylene, i. e., 882 grams. The mixture was refluxed until solution was complete. It was then adjusted to approximately 30° C. to 35° C., and 146 grams of diethylamine added. The mixture was stirred vigorously and formaldehyde added slowly. The formaldehyde was used as a 37% solution and 162 grams were employed, which were added in about 2½ hours. The mixture was stirred vigorously and kept within a temperature range of 30° to 45° C. for about 20 hours. At the end of this period of time it was refluxed, using a phase-separating trap and a small amount of aqueous distillate withdrawn from time to time, and the presence of unreacted formaldehyde noted. Any unreacted formaldehyde seemed to disappear within 2 to 3 hours after refluxing was started. As soon as the odor of formaldehyde was no longer detectable the phase-separating trap was set so as to eliminate all water of solution and reaction. After the water was eliminated part of the xylene was removed until the temperature reached approximately 145° C., or slightly higher. The mass was kept at this higher temperature for about 4 hours and reaction stopped. During this time any additional water, which was probably water of reaction which had formed, was eliminated by means of the trap. The residual xylene was permitted to stay in the cogeneric mixture. A small amount of the sample was heated on a water bath to remove the excess xylene and the residual material was dark red in color and had the consistency of a sticky fluid or tacky resin. The overall time for the reaction was about 30 hours. In other examples it varied from 24 hours to 36 hours. Time can be reduced by cutting low temperature period to approximately 3 to 6 hours.

Note that in Table II following there are a large number of added examples illustrating the same procedure. In each case the initial mixture was stirred and held at a fairly low temperature (30° to 40° C.) for a period of several hours. Then refluxing was employed until the odor of formaldehyde disappeared. After the odor of formaldehyde disappeared the phase-separating trap was employed to separate out all the water, both the solution and condensation. After all the water had been separated enough xylene was taken out to have the final product reflux for several hours somewhere in the range of 145° to 150° C., or thereabouts. Usually the mixture yielded a clear solution by the time the bulk of the water, or all of the water, had been removed.

Note that as pointed out previously, this procedure is illustrated by 24 examples in Table II.

ture of approximately 125° C. to 130° C., and at a pressure of about 15 to 20 pounds.

The time regulator was set so as to inject the ethylene oxide in approximately three hours and then continue stirring for a half-hour or longer. The reaction went readily and, as a matter of fact, the ethylene oxide could have been injected in less than an hour's time and probably the reaction could have been completed without allowing for a subsequent stirring period. The speed of reaction, particularly at the low pressure, undoubtedly was due in a large measure to excellent agitation and also to the comparatively high concentration of catalyst. The amount of ethylene oxide introduced was equal in weight to the initial condensation product, to wit, 10.56 pounds. This represented a molal ratio of 24 moles of ethylene oxide per mole of condensate.

The theoretical molecular weight at the end of the reaction period was 2112. A comparatively small ex-

TABLE II

| Ex. No. | Resin used | Amt., grs. | Amine used and amount | Strength of formaldehyde soln. and amt. | Solvent used and amt. | Reaction, temp., °C. | Reaction time, hrs. | Max. distill. temp., °C. |
|---|---|---|---|---|---|---|---|---|
| 1b | 2a | 882 | Diethylamine, 146 grams | 37%, 162 g | Xylene, 882 g | 20–25 | 30 | 150 |
| 2b | 5a | 480 | Diethylamine, 73 grams | 37%, 81 g | Xylene, 480 g | 22–30 | 24 | 152 |
| 3b | 10a | 633 | ----do---- | 30%, 100 g | Xylene, 633 g | 21–24 | 38 | 147 |
| 4b | 2a | 441 | Dibutylamine, 129 grams | 37%, 81 g | Xylene, 441 g | 25–37 | 32 | 149 |
| 5b | 5a | 480 | ----do---- | ----do---- | Xylene, 480 g | 20–24 | 35 | 149 |
| 6b | 10a | 633 | ----do---- | ----do---- | Xylene, 633 g | 18–23 | 24 | 150 |
| 7b | 2a | 882 | Morpholine, 174 grams | 37%, 162 g | Xylene, 882 g | 20–26 | 35 | 145 |
| 8b | 5a | 480 | Morpholine, 87 grams | 37%, 81 g | Xylene, 480 g | 19–27 | 24 | 156 |
| 9b | 10a | 633 | ----do---- | ----do---- | Xylene, 633 g | 20–23 | 24 | 147 |
| 10b | 13a | 473 | Dioctylamine (di-2-ethylhexylamine), 117 grams | 30%, 100 g | Xylene, 473 g | 20–21 | 38 | 148 |
| 11b | 14a | 511 | ----do---- | ----do---- | Xylene, 511 g | 19–20 | 30 | 146 |
| 12b | 15a | 665 | ----do---- | 37%, 81 g | Xylene, 665 g | 20–26 | 24 | 150 |
| 13b | 2a | 441 | $(C_2H_5OC_2H_4OC_2H_4)_2NH$, 250 grams | 30%, 100 g | Xylene, 441 g | 20–22 | 31 | 147 |
| 14b | 5a | 480 | $(C_2H_5OC_2H_4OC_2H_4)_2NH$, 250 grams | ----do---- | Xylene, 480 g | 20–24 | 36 | 148 |
| 15b | 9a | 595 | $(C_2H_5OC_2H_4OC_2H_4)_2NH$, 250 grams | 37%, 81 g | Xylene, 595 g | 23–28 | 25 | 145 |
| 16b | 2a | 441 | $(C_4H_9OCH_2CH(CH_3)O(CH_3)CHCH_2)_2NH$, 361 grams | ----do---- | Xylene, 441 g | 21–23 | 24 | 151 |
| 17b | 5a | 480 | $(C_4H_9OCH_2CH(CH_3)O(CH_3)CHCH_2)_2NH$, 361 grams | ----do---- | Xylene, 480 g | 20–24 | 24 | 150 |
| 18b | 14a | 511 | $(C_4H_9OCH_2CH(CH_3)O(CH_3)CHCH_2)_2NH$, 361 grams | 30%, 100 g | Xylene, 511 g | 20–22 | 25 | 146 |
| 19b | 22a | 498 | $(CH_3OCH_2CH_2OCH_2CHOCH_2CH_2)_2NH$, 309 grams | 37%, 81 g | Xylene, 498 g | 20–25 | 24 | 140 |
| 20b | 23a | 542 | $(CH_3OCH_2CH_2OCH_2CH_2OCH_2CH_2)_2NH$, 309 grams | ----do---- | Xylene, 542 g | 28–38 | 30 | 142 |
| 21b | 25a | 547 | $(CH_3OCH_2CH_2OCH_2CH_2OCH_2CH_2)_2NH$, 309 grams | ----do---- | Xylene, 547 g | 25–30 | 26 | 148 |
| 22b | 2a | 441 | $(CH_3OCH_2CH_2CH_2CH_2CH_2CH_2)_2NH$, 245 grams | ----do---- | Xylene, 441 g | 20–22 | 28 | 143 |
| 23b | 26a | 595 | $(CH_3OCH_2CH_2CH_2CH_2CH_2CH_2)_2NH$, 245 grams | 30%, 100 g | Xylene, 595 g | 18–20 | 25 | 146 |
| 24b | 27a | 391 | $(CH_3OCH_2CH_2CH_2CH_2CH_2CH_2)_2NH$, 98 grams | 30%, 50 g | Xylene, 391 g | 19–22 | 24 | 145 |

PART 5

In preparing oxyalkylated derivatives of products of the kind which appear as examples in Part 3, I have found it particularly advantageous to use laboratory equipment which permits continuous oxypropylation and oxyethylation. More specific reference will be made to treatment with glycide subsequently in the text. The oxyethylation step is, of course, the same as the oxypropylation step insofar that two low boiling liquids are handled in each instance. What immediately follows refers to oxyethylation and it is understood that oxypropylation can be handled conveniently in exactly the same manner. The oxyalkylation of the amine resin condensates is carried out by procedures which are commonly used for the oxyalkylation of oxyalkylation susceptible materials. The factors to be considered are discussed in some detail in applications Serial Nos. 301,803 and 310,551 and reference is made to those applications for a description of suitable equipment, precautions to be taken and a general discussion of operating technique. The following examples are given by way of illustration.

Example 1c

The oxyalkylation-susceptible compound employed is the one previously described and designated as Example 1b. Condensate 1b was in turn obtained from diethylamine and the resin previously identified as Example 2a. Reference to Table I shows that this particular resin is obtained from paratertiarybutylphenol and formaldehyde. 10.56 pounds of this resin condensate were dissolved in 8.8 pounds of solvent (xylene) along with one pound of finely powdered caustic soda as a catalyst. Adjustment was made in the autoclave to operate at a temperaample, less than 50 grams, was withdrawn merely for examination as far as solubility or emulsifying power was concerned and also for the purpose of making some tests on various oil-field emulsions. The amount withdrawn was so small that no cognizance of this fact is included in the data, or subsequent data, or in the data presented in tabular form in subsequent Tables 3 and 4.

The size of the autoclave employed was 25 gallons. In innumerable comparable oxyalkylations I have withdrawn a substantial portion at the end of each step and continued oxyalkylation on a partial residue sample. This was not the case in this particular series. Certain examples were duplicated as hereinafter noted and subjected to oxyalkylation with a different oxide.

Example 2c

This example simply illustrates the further oxyalkylation of Example 1c, preceding. As previously stated, the oxyalkylation-susceptible compound, to wit, Example 1b, present at the beginning of the stage was obviously the same as at the end of the prior stage (Example 1c), to wit, 10.56 pounds. The amount of oxide present in the initial step was 10.56 pounds, the amount of catalyst remained the same, to wit, one pound, and the amount of solvent remained the same. The amount of oxide added was another 10.56 pounds, all addition of oxide in these various stages being based on the addition of this particular amount. Thus, at the end of the oxyethylation step the amount of oxide added was a total of 21.12 pounds and the molal ratio of ethylene oxide to resin condensate was 48 to 1. The theoretical molecular weight was 3168.

The maximum temperature during the operation was 125° C. to 130° C. The maximum pressure was in the range of 15 to 20 pounds. The time period was 3½ hours.

*Example 3c*

The oxyalkylation proceeded in the same manner described in Examples 1c and 2c. There was no added solvent and no added catalyst. The oxide added was 10.56 pounds and the total oxide in at the end of the oxyethylation step was 31.68 pounds. The molal ratio of oxide to condensate was 72 to 1. Conditions as far as temperature and pressure and time were concerned were all the same as in Examples 1c and 2c. The time period, as in Examples 1c and 2c, was 3½ hours.

*Example 4c*

The oxyethylation was continued and the amount of oxide added again was 10.56 pounds. There was no added catalyst and no added solvent. The theoretical molecular weight at the end of the reaction period was 5280. The molal ratio of oxide to condensate was 96 to 1. Conditions as far as temperature and pressure were concerned were the same as in previous examples. The time period was slightly longer, to wit, 4 hours. The reaction unquestionably began to slow up somewhat.

*Example 5c*

The oxyethylation continued with the introduction of another 10.56 pounds of ethylene oxide. No added solvent was introduced and, likewise, no added catalyst was introduced. The theoretical molecular weight at the end of the agitation period was 6336, and the molal ratio of oxide to resin condensate was 124 to 1. The time period, however, had increased to 5 hours even though the operating temperature and pressure remained the same as in previous example.

*Example 6c*

The same procedure was followed as in the previous examples except that an added ¼ pound of powdered caustic soda was introduced to speed up the reaction. The amount of oxide added was another 10.56 pounds, bringing the total oxide introduced to 63.36 pounds. The temperature and pressure during this period were the same as before.

Notwithstanding the addition of added caustic the time required for the oxyethylation was 5 hours. There was no added solvent.

*Example 7c*

The same procedure was followed as in the previous six examples without the addition of more caustic or more solvent. The total amount of oxide introduced at the end of the period was 72.93 pounds. The theoretical molecular weight at the end of the oxyalkylation period was 8448. The time required for the oxyethylation was a bit longer than in the previous step, to wit, 6 hours.

*Example 8c*

This was the final oxyethylation in this particular series. There was no added solvent and no added catalyst. The total amount of oxide added at the end of this step was 85.48 pounds. The theoretical molecular weight was 9604. The molal ratio of oxide to resin condensate was 192. Conditions as far as temperature and pressure were concerned were the same as in the previous examples and the time required for oxyethylation was the same as in Example 7c, preceding, to wit, 6 hours.

The same procedure as described in the previous examples was employed in connection with a number of the other condensates described previously. All these data have been presented in tabular form in a series of four tables, Tables III and IV, V and VI.

In substantially every case a 25-gallon autoclave was employed, although in some instances the initial oxyethylation was started in a 15-gallon autoclave and then transferred to a 25-gallon autoclave. This is immaterial but happened to be a matter of convenience only. The solvent used in all cases was xylene. The catalyst used was finely powdered caustic soda.

Referring now to Tables III and IV, it will be noted that compounds 1c through 40c were obtained by the use of ethylene oxide, whereas 41c through 80c were obtained by the use of propylene oxide alone.

Thus, in reference to Table III it is to be noted as follows.

The example number of each compound is indicated in the first column.

The identity of the oxyalkylation-susceptible compound, to wit, the resin condensate, is indicated in the second column.

The amount of condensate is shown in the third column.

Assuming that ethylene oxide alone is employed, as happens to be the case in Examples 1c through 40c, the amount of oxide present in the oxyalkylation derivative is shown in column 4, although in the initial step since no oxide is present there is a blank.

When ethylene oxide is used exclusively the 5th column is blank.

The 6th column shows the amount of powdered caustic soda used as a catalyst, and the 7th column shows the amount of solvent employed.

The 8th column can be ignored where a single oxide was employed.

The 9th column shows the theoretical molecular weight at the end of the oxyalkylation period.

The 10th column states the amount of condensate present in the reaction mass at the end of the period.

As pointed out previously, in this particular series the amount of reaction mass withdrawn for examination was so small that it was ignored and for this reason the resin condensate in column 10 coincides with the figure in column 3.

Column 11 shows the amount of ethylene oxide employed in the reaction mass at the end of the particular period.

Column 12 can be ignored insofar that no propylene oxide was employed.

Column 13 shows the catalyst at the end of the reaction period.

Column 14 shows the amount of solvent at the end of the reaction period.

Column 15 shows the molal ratio of ethylene oxide to condensate.

Column 16 can be ignored for the reason that no propylene oxide was employed.

Referring now to Table VI. It is to be noted that the first column refers to Examples 1c, 2c, 3c, etc.

The second column gives the maximum temperature employed during the oxyalkylation step and the third column gives the maximum pressure.

The fourth column gives the time period employed.

The last three columns show solubility tests by shaking a small amount of the compound, including the solvent present, with several volumes of water, xylene and kerosene. It sometimes happens that although xylene in comparatively small amounts will dissolve in the concentrated material, when the concentrated material in turn is diluted with xylene separation takes place.

Referring to Table IV, Examples 41c through 80c are the counterparts of Examples 1c through 40c, except that the oxide employed is propylene oxide instead of ethylene oxide. Therefore, as explained previously, four columns are blank, to wit, columns 4, 8, 11 and 15.

Reference is now made to Table V. It is to be noted these compounds are designated by "d" numbers, 1d, 2d, 3d, etc., through and including 32d. They are derived, in turn, from compounds in the "c" series, for example, 35c, 39c, 53c and 62c. These compounds involve the use of both ethylene oxide and propylene oxide. Since compounds 1c through 40c were obtained by the use of ethylene oxide, it is obvious that those obtained from 35c, through 39c, involve the use of ethylene oxide first, and propylene oxide afterward. Inversely, those compounds obtained from 53c and 62c obviously came from a prior series in which propylene oxide was used first.

In the preparation of this series indicated by the small letter "d," as 1d, 2d, 3d, etc., the initial "c" series such as 35c, 39c, 53c, and 62c, were duplicated and the oxyalkylation stopped at the point designated instead of being carried further as may have been the case in the original oxyalkylation step. Then oxyalkylation proceeded by using the second oxide as indicated by the previous explanation, to wit, propylene oxide in 1d through 16d, and ethylene oxide in 17d through 32d, inclusive.

In examining the table beginning with 1d, it will be noted that the initial product, i. e., 35c, consisted of the reaction product involving 10.5 pounds of the resin condensate, 15.84 pounds of ethylene oxide, 1.0 pounds of caustic soda, and 8.8 pounds of the solvent.

It is to be noted that reference to the catalyst in Table V refers to the total amount of catalyst, i. e., the catalyst present from the first oxyalkylation step plus added catalyst, if any. The same is true in regard to the solvent. Reference to the solvent refers to the total solvent present, i. e., that from the first oxyalkylation step plus added solvent, if any.

In this series, it will be noted that the theoretical molecular weights are given prior to the oxyalkylation step and after the oxyalkylation step, although the value at the end of one step is the value at the beginning of the next step, except obviously at the very start the value depends on the theoretical molecular weight at the end of the initial oxyalkylation step; i. e., oxyethylation for 1d through 16d, and oxypropylation for 17d through 32d.

It will be noted also that under the molal ratio the values of both oxides to the resin condensate are included.

The data given in regard to the operating conditions is substantially the same as before and appears in Table VI.

The products resulting from these procedures may contain modest amounts, or have small amounts, of the solvents as indicated by the figures in the tables. If desired the solvent may be removed by distillation, and particularly vacuum distillation. Such distillation also may remove traces or small amounts of uncombined oxide, if present and volatile under the conditions employed.

Obviously, in the use of ethylene oxide and propylene oxide in combination one need not first use one oxide and then the other, but one can mix the two oxides and thus obtain what may be termed an indifferent oxyalkylation, i. e., no attempt to selectively add one and then the other, or any other variant.

Needless to say, one could start with ethylene oxide and then use propylene oxide, and then go back to ethylene oxide; or, inversely, start with propylene oxide, then use ethylene oxide, and then go back to propylene oxide; or, one could use a combination in which butylene oxide is used along with either one of the two oxides just mentioned, or a combination of both of them.

TABLE III

| Ex. No. | Composition before | | | | | | Composition at end | | | | | Molal ratio | | Molec. wt. based on theoretical value |
|---|---|---|---|---|---|---|---|---|---|---|---|---|---|---|
| | O-S* cmpd., ex. No. | O-S* cmpd., lbs. | Ethl. oxide, lbs. | Propl. oxide, lbs. | Catalyst, lbs. | Solvent, lbs. | O-S* cmpd., lbs. | Ethl. oxide, lbs. | Propl. oxide, lbs. | Catalyst, lbs. | Sol. vent, lbs. | Ethyl. oxide to oxyalkyl. suscept. cmpd. | Propl. oxide to oxyalkyl. suscept. cmpd. | |
| 1c | 1b | 10.56 | | | 1.0 | 8.8 | 10.56 | 10.56 | | 1.0 | 8.8 | 24 | | 2,112 |
| 2c | 1b | 10.56 | 10.56 | | 1.0 | 8.8 | 10.56 | 21.12 | | 1.0 | 8.8 | 48 | | 3,168 |
| 3c | 1b | 10.56 | 21.12 | | 1.0 | 8.8 | 10.56 | 31.68 | | 1.0 | 8.8 | 72 | | 4,224 |
| 4c | 1b | 10.56 | 31.68 | | 1.0 | 8.8 | 10.56 | 42.24 | | 1.0 | 8.8 | 96 | | 5,280 |
| 5c | 1b | 10.56 | 42.24 | | 1.0 | 8.8 | 10.56 | 52.80 | | 1.0 | 8.8 | 124 | | 6,336 |
| 6c | 1b | 10.56 | 52.80 | | 1.25 | 8.8 | 10.56 | 63.36 | | 1.25 | 8.8 | 144 | | 7,392 |
| 7c | 1b | 10.56 | 63.36 | | 1.25 | 8.8 | 10.56 | 73.92 | | 1.25 | 8.8 | 168 | | 8,448 |
| 8c | 1b | 10.56 | 73.92 | | 1.25 | 8.8 | 10.56 | 85.48 | | 1.25 | 8.8 | 192 | | 9,604 |
| 9c | 5b | 12.56 | | | 1.0 | 9.6 | 12.56 | 12.56 | | 1.0 | 9.6 | 28.6 | | 2,512 |
| 10c | 5b | 12.56 | 12.56 | | 1.0 | 9.6 | 12.56 | 25.12 | | 1.0 | 9.6 | 57.2 | | 3,768 |
| 11c | 5b | 12.56 | 25.12 | | 1.0 | 9.6 | 12.56 | 37.68 | | 1.0 | 9.6 | 85.8 | | 5,024 |
| 12c | 5b | 12.56 | 37.68 | | 1.0 | 9.6 | 12.56 | 50.24 | | 1.0 | 9.6 | 114.4 | | 6,280 |
| 13c | 5b | 12.56 | 50.24 | | 1.0 | 9.6 | 12.56 | 62.80 | | 1.0 | 9.6 | 143.0 | | 7,536 |
| 14c | 5b | 12.56 | 62.80 | | 1.5 | 9.6 | 12.56 | 75.36 | | 1.5 | 9.6 | 171.6 | | 8,792 |
| 15c | 5b | 12.56 | 75.63 | | 1.5 | 9.6 | 12.56 | 87.92 | | 1.5 | 9.6 | 200.2 | | 10,048 |
| 16c | 5b | 12.56 | 87.92 | | 1.5 | 9.6 | 12.56 | 100.48 | | 1.5 | 9.6 | 228.8 | | 11,304 |
| 17c | 7b | 10.84 | | | 1.0 | 8.8 | 10.84 | 10.84 | | 1.0 | 8.8 | 24.6 | | 2,168 |
| 18c | 7b | 10.84 | 10.84 | | 1.0 | 8.8 | 10.84 | 21.68 | | 1.0 | 8.8 | 49.2 | | 3,252 |
| 19c | 7b | 10.84 | 21.68 | | 1.0 | 8.8 | 10.84 | 32.52 | | 1.0 | 8.8 | 73.8 | | 4,336 |
| 20c | 7b | 10.84 | 32.52 | | 1.0 | 8.8 | 10.84 | 43.36 | | 1.0 | 8.8 | 98.4 | | 5,420 |
| 21c | 7b | 10.84 | 43.36 | | 1.0 | 8.8 | 10.84 | 54.20 | | 1.0 | 8.8 | 123.0 | | 6,504 |
| 22c | 7b | 10.84 | 54.20 | | 1.25 | 8.8 | 10.84 | 65.04 | | 1.25 | 8.8 | 147.6 | | 7,588 |
| 23c | 7b | 10.84 | 65.04 | | 1.25 | 8.8 | 10.84 | 75.88 | | 1.25 | 8.8 | 172.2 | | 8,672 |
| 24c | 7b | 10.84 | 75.88 | | 1.25 | 8.8 | 10.84 | 86.72 | | 1.25 | 8.8 | 196.8 | | 9,756 |
| 25c | 11b | 12.84 | | | 1.0 | 10.2 | 12.84 | 12.84 | | 1.0 | 10.2 | 29.2 | | 2,568 |
| 26c | 11b | 12.84 | 12.84 | | 1.0 | 10.2 | 12.84 | 25.68 | | 1.0 | 10.2 | 58.4 | | 3,852 |
| 27c | 11b | 12.84 | 25.68 | | 1.0 | 10.2 | 12.84 | 38.52 | | 1.0 | 10.2 | 87.6 | | 5,136 |
| 28c | 11b | 12.84 | 38.52 | | 1.0 | 10.2 | 12.84 | 51.36 | | 1.0 | 10.2 | 116.8 | | 6,420 |
| 29c | 11b | 12.84 | 51.36 | | 1.0 | 10.2 | 12.84 | 64.20 | | 1.0 | 10.2 | 146.0 | | 7,704 |
| 30c | 11b | 12.84 | 64.20 | | 1.5 | 10.2 | 12.84 | 77.04 | | 1.5 | 10.2 | 175.2 | | 8,988 |
| 31c | 11b | 12.84 | 77.04 | | 1.5 | 10.2 | 12.84 | 89.88 | | 1.5 | 10.2 | 204.4 | | 10,272 |
| 32c | 11b | 12.84 | 89.88 | | 1.5 | 10.2 | 12.84 | 102.72 | | 1.5 | 10.2 | 233.6 | | 11,556 |
| 33c | 1b | 10.56 | | | 1.0 | 8.8 | 10.56 | 5.28 | | 1.0 | 8.8 | 12 | | 1,584 |
| 34c | 1b | 10.56 | 5.28 | | 1.0 | 8.8 | 10.56 | 10.56 | | 1.0 | 8.8 | 24 | | 2,112 |
| 35c | 1b | 10.56 | 10.56 | | 1.0 | 8.8 | 10.56 | 15.84 | | 1.0 | 8.8 | 36 | | 2,640 |
| 36c | 1b | 10.56 | 15.84 | | 1.0 | 8.8 | 10.56 | 21.12 | | 1.0 | 8.8 | 48 | | 3,168 |
| 37c | 1b | 10.56 | 21.12 | | 1.0 | 8.8 | 10.56 | 26.40 | | 1.0 | 8.8 | 60 | | 3,696 |
| 38c | 1b | 10.56 | 26.40 | | 1.0 | 8.8 | 10.56 | 31.68 | | 1.0 | 8.8 | 72 | | 4,224 |
| 39c | 1b | 10.56 | 31.68 | | 1.0 | 8.8 | 10.56 | 36.96 | | 1.0 | 8.8 | 84 | | 4,752 |
| 40c | 1b | 10.56 | 36.96 | | 1.0 | 8.8 | 10.56 | 42.24 | | 1.0 | 8.8 | 96 | | 5,280 |

*Oxyalkylation-susceptible.

The colors of the products usually vary from a reddish amber tint to a definitely red, and amber. The reason is primarily that no effort is made to obtain colorless resins initially and the resins themselves may be yellow, amber, or even dark amber. Condensation of a nitrogenous product invariably yields a darker product

TABLE IV

| Ex. No. | Composition before | | | | | | Composition at end | | | | | Molal ratio | | Molec. wt. based on theoretical value |
|---|---|---|---|---|---|---|---|---|---|---|---|---|---|---|
| | O-S* cmpd., ex. No. | O-S* cmpd., lbs. | Ethl. oxide, lbs. | Propl. oxide, lbs. | Catalyst, lbs. | Solvent, lbs. | O-S* cmpd., lbs. | Ethl. oxide, lbs. | Propl. oxide, lbs. | Catalyst, lbs. | Sol. vent, lbs. | Ethyl. oxide to oxyalkyl. suscept. cmpd. | Propl. oxide to oxyalkyl. suscept. cmpd. | |
| 41c | 1b | 10.56 | | | 1.0 | 8.8 | 10.56 | | 10.56 | 1.0 | 8.8 | | 18.2 | 2,112 |
| 42c | 1b | 10.56 | | 10.56 | 1.0 | 8.8 | 10.56 | | 21.12 | 1.0 | 8.8 | | 36.4 | 3,168 |
| 43c | 1b | 10.56 | | 21.12 | 1.0 | 8.8 | 10.56 | | 21.68 | 1.0 | 8.8 | | 54.6 | 4,224 |
| 44c | 1b | 10.56 | | 31.68 | 1.0 | 8.8 | 10.56 | | 42.24 | 1.0 | 8.8 | | 72.8 | 5,280 |
| 45c | 1b | 10.56 | | 42.24 | 1.0 | 8.8 | 10.56 | | 52.80 | 1.0 | 8.8 | | 91.0 | 6,336 |
| 46c | 1b | 10.56 | | 52.80 | 1.5 | 8.8 | 10.56 | | 73.92 | 1.5 | 8.8 | | 127.4 | 8,348 |
| 47c | 1b | 10.56 | | 73.92 | 1.5 | 8.8 | 10.56 | | 95.04 | 1.5 | 8.8 | | 163.8 | 10,560 |
| 48c | 1b | 10.56 | | 95.04 | 1.5 | 8.8 | 10.56 | | 116.16 | 1.5 | 8.8 | | 200.2 | 12,672 |
| 49c | 5b | 12.56 | | | 1.2 | 9.6 | 12.56 | | 12.56 | 1.2 | 9.6 | | 21.6 | 2,512 |
| 50c | 5b | 12.56 | | 12.56 | 1.2 | 9.6 | 12.56 | | 25.12 | 1.2 | 9.6 | | 43.2 | 3,768 |
| 51c | 5b | 12.56 | | 25.12 | 1.2 | 9.6 | 12.56 | | 37.68 | 1.2 | 9.6 | | 64.8 | 5,024 |
| 52c | 5b | 12.56 | | 37.68 | 1.2 | 9.6 | 12.56 | | 50.24 | 1.2 | 9.6 | | 86.4 | 6,280 |
| 53c | 5b | 12.56 | | 50.24 | 1.2 | 9.6 | 12.56 | | 62.80 | 1.2 | 9.6 | | 108.0 | 7,836 |
| 54c | 5b | 12.56 | | 62.80 | 1.2 | 9.6 | 12.56 | | 87.92 | 1.2 | 9.6 | | 151.2 | 10,048 |
| 55c | 5b | 12.56 | | 87.92 | 1.2 | 9.6 | 12.56 | | 113.04 | 1.2 | 9.6 | | 194.8 | 12,560 |
| 56c | 5b | 12.56 | | 113.04 | 1.2 | 9.6 | 12.56 | | 138.16 | 1.2 | 9.6 | | 238.2 | 15,072 |
| 57c | 7b | 10.84 | | | 1.0 | 8.8 | 10.84 | | 10.84 | 1.0 | 8.8 | | 18.7 | 2,168 |
| 58c | 7b | 10.84 | | 10.84 | 1.0 | 8.8 | 10.84 | | 21.68 | 1.0 | 8.8 | | 37.4 | 3,252 |
| 59c | 7b | 10.84 | | 21.68 | 1.0 | 8.8 | 10.84 | | 32.52 | 1.0 | 8.8 | | 56.1 | 4,336 |
| 60c | 7b | 10.84 | | 32.52 | 1.0 | 8.8 | 10.84 | | 43.36 | 1.0 | 8.8 | | 74.8 | 5,420 |
| 61c | 7b | 10.84 | | 43.36 | 1.0 | 8.8 | 10.84 | | 54.20 | 1.0 | 8.8 | | 93.5 | 6,504 |
| 62c | 7b | 10.84 | | 54.20 | 1.0 | 8.8 | 10.84 | | 75.88 | 1.0 | 8.8 | | 130.9 | 8,672 |
| 63c | 7b | 10.84 | | 75.88 | 1.0 | 8.8 | 10.84 | | 97.56 | 1.0 | 8.8 | | 170.3 | 10,840 |
| 64c | 7b | 10.84 | | 97.56 | 1.0 | 8.8 | 10.84 | | 119.24 | 1.0 | 8.8 | | 205.7 | 13,008 |
| 65c | 11b | 12.84 | | | 1.0 | 10.2 | 12.84 | | 12.84 | .6 | 10.2 | | 22.2 | 2,568 |
| 66c | 11b | 12.84 | | 12.84 | 1.0 | 10.2 | 12.84 | | 25.68 | .6 | 10.2 | | 44.3 | 3,852 |
| 67c | 11b | 12.84 | | 25.68 | 1.0 | 10.2 | 12.84 | | 38.52 | .6 | 10.2 | | 66.4 | 5,136 |
| 68c | 11b | 12.84 | | 38.52 | 1.0 | 10.2 | 12.84 | | 51.36 | .6 | 10.2 | | 88.5 | 6,420 |
| 69c | 11b | 12.84 | | 51.36 | 1.0 | 10.2 | 12.84 | | 64.20 | .6 | 10.2 | | 110.6 | 7,704 |
| 70c | 11b | 12.84 | | 64.20 | 1.25 | 10.2 | 12.84 | | 89.88 | .9 | 10.2 | | 154.8 | 10,272 |
| 71c | 11b | 12.84 | | 89.88 | 1.25 | 10.2 | 12.84 | | 115.56 | .9 | 10.2 | | 199.5 | 12,840 |
| 72c | 11b | 12.84 | | 115.56 | 1.25 | 10.2 | 12.84 | | 141.24 | .9 | 10.2 | | 244.0 | 15,408 |
| 73c | 1b | 10.56 | | | 1.0 | 8.8 | 10.56 | | 5.28 | 1.0 | 8.8 | | 9.1 | 1,584 |
| 74c | 1b | 10.56 | | 5.28 | 1.0 | 8.8 | 10.56 | | 10.56 | 1.0 | 8.8 | | 18.2 | 2,112 |
| 75c | 1b | 10.56 | | 10.56 | 1.0 | 8.8 | 10.56 | | 15.84 | 1.0 | 8.8 | | 27.3 | 2,640 |
| 76c | 1b | 10.56 | | 15.84 | 1.0 | 8.8 | 10.56 | | 21.12 | 1.0 | 8.8 | | 36.4 | 3,168 |
| 77c | 1b | 10.56 | | 21.12 | 1.0 | 8.8 | 10.56 | | 26.40 | 1.0 | 8.8 | | 45.5 | 3,696 |
| 78c | 1b | 10.56 | | 26.40 | 1.0 | 8.8 | 10.56 | | 36.96 | 1.0 | 8.8 | | 63.7 | 4,752 |
| 79c | 1b | 10.56 | | 36.96 | 1.05 | 8.8 | 10.56 | | 47.52 | 1.25 | 8.8 | | 81.9 | 5,805 |
| 80c | 1b | 10.56 | | 47.52 | 1.25 | 8.8 | 10.56 | | 58.08 | 1.25 | 8.8 | | 100.1 | 6,864 |

*Oxyalkylation-susceptible.

TABLE V

| Ex. No. | Composition before | | | | | | Composition at end | | | | | Molal ratio | | Molec. wt. based on theoretical value |
|---|---|---|---|---|---|---|---|---|---|---|---|---|---|---|
| | O-S* cmpd., ex. No. | O-S* cmpd., lbs. | Ethl. oxide, lbs. | Propl. oxide, lbs. | Catalyst, lbs. | Solvent, lbs. | O-S* cmpd., lbs. | Ethl. oxide, lbs. | Propl. oxide, lbs. | Catalyst, lbs. | Sol. vent, lbs. | Ethyl. oxide to oxyalkyl. suscept. cmpd. | Propl. oxide to oxyalkyl. suscept. cmpd. | |
| 1d | 35c | 10.56 | 15.84 | | 1.0 | 8.8 | 10.56 | 15.84 | 5.28 | 1.0 | 8.8 | 36 | 9.1 | 3,168 |
| 2d | 35c | 10.56 | 15.84 | 5.28 | 1.0 | 8.8 | 10.56 | 15.84 | 10.56 | 1.0 | 8.8 | 36 | 18.2 | 3,696 |
| 3d | 35c | 10.56 | 15.84 | 10.56 | 1.0 | 8.8 | 10.56 | 15.84 | 15.84 | 1.0 | 8.8 | 36 | 27.3 | 4,224 |
| 4d | 35c | 10.56 | 15.84 | 15.84 | 1.0 | 8.8 | 10.56 | 15.84 | 21.12 | 1.0 | 8.8 | 36 | 36.4 | 4,752 |
| 5d | 35c | 10.56 | 15.84 | 21.12 | 1.5 | 8.8 | 10.56 | 15.84 | 26.40 | 1.5 | 8.8 | 36 | 45.5 | 5,280 |
| 6d | 35c | 10.56 | 15.84 | 26.40 | 1.5 | 8.8 | 10.56 | 15.84 | 31.68 | 1.5 | 8.8 | 36 | 54.6 | 5,908 |
| 7d | 35c | 10.56 | 15.84 | 31.68 | 1.5 | 8.8 | 10.56 | 15.84 | 36.96 | 1.5 | 8.8 | 36 | 63.7 | 6,438 |
| 8d | 35c | 10.56 | 15.84 | 36.96 | 1.5 | 8.8 | 10.56 | 15.84 | 42.24 | 1.5 | 8.8 | 36 | 72.8 | 6,964 |
| 9d | 39c | 10.56 | 36.96 | | 1.5 | 8.8 | 10.56 | 36.96 | 5.28 | 1.5 | 8.8 | 84 | 9.1 | 5,280 |
| 10d | 39c | 10.56 | 36.96 | 5.28 | 1.5 | 8.8 | 10.56 | 36.96 | 10.56 | 1.5 | 8.8 | 84 | 18.2 | 5,808 |
| 11d | 39c | 10.56 | 36.96 | 10.56 | 1.5 | 8.8 | 10.56 | 36.96 | 15.84 | 1.5 | 8.8 | 84 | 27.3 | 6,336 |
| 12d | 39c | 10.56 | 36.96 | 15.84 | 1.5 | 8.8 | 10.56 | 36.96 | 26.40 | 1.5 | 8.8 | 84 | 45.5 | 7,392 |
| 13d | 39c | 10.56 | 36.96 | 26.40 | 1.5 | 8.8 | 10.56 | 36.96 | 36.96 | 1.5 | 8.8 | 84 | 63.7 | 8,448 |
| 14d | 39c | 10.56 | 36.96 | 36.96 | 1.5 | 8.8 | 10.56 | 36.96 | 47.52 | 1.5 | 8.8 | 84 | 81.9 | 9,504 |
| 15d | 39c | 10.56 | 36.96 | 47.52 | 1.5 | 8.8 | 10.56 | 36.96 | 58.08 | 1.5 | 8.8 | 84 | 100.1 | 10,560 |
| 16d | 39c | 10.56 | 36.96 | 58.08 | 1.5 | 8.8 | 10.56 | 36.96 | 68.64 | 1.5 | 8.8 | 84 | 118.3 | 11,616 |
| 17d | 53c | 12.56 | | 62.80 | 1.7 | 9.6 | 12.56 | 6.28 | 62.80 | 1.7 | 9.6 | 14.3 | 108.0 | 8,468 |
| 18d | 53c | 12.56 | 6.28 | 62.80 | 1.7 | 9.6 | 12.56 | 12.56 | 62.80 | 1.7 | 9.6 | 28.6 | 108.0 | 9,092 |
| 19d | 53c | 12.56 | 12.56 | 62.80 | 1.7 | 9.6 | 12.56 | 18.84 | 62.80 | 1.7 | 9.6 | 42.8 | 108.0 | 10,348 |
| 20d | 53c | 12.56 | 18.84 | 62.80 | 1.7 | 9.6 | 12.56 | 31.40 | 62.80 | 1.7 | 9.6 | 71.4 | 108.0 | 11,604 |
| 21d | 53c | 12.56 | 31.40 | 62.80 | 1.7 | 9.6 | 12.56 | 43.96 | 62.80 | 1.7 | 9.6 | 99.9 | 108.0 | 12,860 |
| 22d | 53c | 12.56 | 43.96 | 62.80 | 1.7 | 9.6 | 12.56 | 56.52 | 62.80 | 1.7 | 9.6 | 128.5 | 108.0 | 14,116 |
| 23d | 53c | 12.56 | 56.52 | 62.80 | 1.7 | 9.6 | 12.56 | 69.08 | 62.80 | 1.7 | 9.6 | 157.0 | 108.0 | 15,372 |
| 24d | 53c | 12.56 | 69.08 | 62.80 | 1.7 | 9.6 | 12.56 | 81.64 | 62.80 | 1.7 | 9.6 | 185.5 | 108.0 | 16,628 |
| 25d | 62c | 10.84 | | 75.88 | 1.5 | 8.8 | 10.84 | | 75.88 | 1.5 | 8.8 | 12.3 | 130.9 | 9,214 |
| 26d | 62c | 10.84 | 5.42 | 75.88 | 1.5 | 8.8 | 10.84 | 10.84 | 75.88 | 1.5 | 8.8 | 24.6 | 130.9 | 9,756 |
| 27d | 62c | 10.84 | 10.84 | 75.88 | 1.5 | 8.8 | 10.84 | 16.26 | 75.88 | 1.5 | 8.8 | 36.9 | 130.9 | 10,298 |
| 28d | 62c | 10.84 | 16.26 | 75.88 | 1.5 | 8.8 | 10.84 | 27.10 | 75.88 | 1.5 | 8.8 | 61.5 | 130.9 | 11,382 |
| 29d | 62c | 10.84 | 27.10 | 75.88 | 1.5 | 8.8 | 10.84 | 37.94 | 75.88 | 1.5 | 8.8 | 86.1 | 130.9 | 12,466 |
| 30d | 62c | 10.84 | 37.94 | 75.88 | 1.5 | 8.8 | 10.84 | 48.78 | 75.88 | 1.5 | 8.8 | 110.7 | 130.9 | 13,550 |
| 31d | 62c | 10.84 | 48.78 | 75.88 | 1.5 | 8.8 | 10.84 | 75.88 | 75.88 | 1.5 | 8.8 | 135.3 | 130.9 | 14,634 |
| 32d | 62c | 10.84 | 59.62 | 75.88 | 1.5 | 8.8 | 10.84 | 75.88 | 75.88 | 1.5 | 8.8 | 172.0 | 130.9 | 16,626 |

*Oxyalkylation-susceptible.

than the original resin and usually has a reddish color. The solvent employed, if xylene, adds nothing to the color but one may use a darker colored aromatic petroleum solvent. Oxyalkylation generally tends to yield lighter colored products and the more oxide employed the lighter the color of the product. Products can be prepared in which the final color is a lighter amber with a reddish tint. Such products can be decolorized by the use of clays, bleaching chars, etc. As far as use in demulsification is concerned, or some other industrial uses, there is no justification for the cost of bleaching the product.

Generally speaking, the amount of alkaline catalyst present is comparatively small and it need not be removed. Since the products per se are alkaline due to the presence of a basic nitrogen, the removal of the alkaline catalyst is somewhat more difficult than ordinarily is the case for the reason that if one adds hydrochloric acid, for example, to neutralize the alkalinity one may partially neutralize the basic nitrogen radical also. The preferred procedure is to ignore the presence of the alkali unless it is objectionable or else add a stoichiometric amount of concentrated hydrochloric acid equal to the caustic soda present.

TABLE VI

| Ex. No. | Max. temp., °C. | Max. pres., p. s. i. | Time, hrs. | Solubility | | |
|---|---|---|---|---|---|---|
| | | | | Water | Xylene | Kerosene |
| 1c | 125-130 | 15-20 | 3½ | Insoluble | | |
| 2c | 125-130 | 15-20 | 3½ | Emulsifiable | | |
| 3c | 125-130 | 15-20 | 3½ | Soluble | | |
| 4c | 125-130 | 15-20 | 4 | ----do---- | | |
| 5c | 125-130 | 15-20 | 5 | ----do---- | | |
| 6c | 125-130 | 15-20 | 5 | ----do---- | | |
| 7c | 125-130 | 15-20 | 6 | ----do---- | | |
| 8c | 125-130 | 15-20 | 6 | ----do---- | | |
| 9c | 125-130 | 15-20 | 3 | Insoluble | | |
| 10c | 125-130 | 15-20 | 2½ | Emulsifiable | | |
| 11c | 125-130 | 15-20 | 3 | Soluble | | |
| 12c | 125-130 | 15-20 | 3 | ----do---- | | |
| 13c | 125-130 | 15-20 | 3½ | ----do---- | | |
| 14c | 125-130 | 15-20 | 5 | ----do---- | | |
| 15c | 125-130 | 15-20 | 6 | ----do---- | | |
| 16c | 125-130 | 15-20 | 6 | ----do---- | | |
| 17b | 130-135 | 15-20 | 4 | Insoluble | | |
| 18c | 130-135 | 15-20 | 3 | Emulsifiable | | |
| 19c | 130-135 | 15-20 | 3 | Soluble | | |
| 20c | 130-135 | 15-20 | 4 | ----do---- | | |
| 21c | 130-135 | 15-20 | 4 | ----do---- | | |
| 22c | 130-135 | 15-20 | 3 | ----do---- | | |
| 23c | 130-135 | 15-20 | 3½ | ----do---- | | |
| 24c | 130-135 | 15-20 | 4 | ----do---- | | |
| 25c | 125-130 | 5-10 | 2 | Insoluble | | |
| 26c | 125-130 | 5-10 | 2 | Emulsifiable | | |
| 27c | 125-130 | 5-10 | 2½ | Soluble | | |
| 28c | 125-130 | 5-10 | 3 | ----do---- | | |
| 29c | 125-130 | 5-10 | 4 | ----do---- | | |
| 30c | 125-130 | 5-10 | 3 | ----do---- | | |
| 31c | 125-130 | 5-10 | 4 | ----do---- | | |
| 32c | 125-130 | 5-10 | 5 | ----do---- | | |
| 33c | 125-130 | 10-15 | 1½ | Insoluble | | |
| 34c | 125-130 | 10-15 | 1½ | ----do---- | | |
| 35c | 125-130 | 10-15 | 2 | Emulsifiable | | |
| 36c | 125-130 | 10-15 | 3 | ----do---- | | |
| 37c | 125-130 | 10-15 | 3 | Soluble | | |
| 38c | 125-130 | 10-15 | 4 | ----do---- | | |
| 39c | 125-130 | 10-15 | 4½ | ----do---- | | |
| 40c | 125-130 | 10-15 | 5 | ----do---- | | |
| 41c | 130-135 | 10-15 | 2½ | Insoluble | Soluble | Insoluble. |
| 42c | 130-135 | 10-15 | 3 | ----do---- | ----do---- | Dispersible. |
| 43c | 130-135 | 10-15 | 3 | ----do---- | ----do---- | Do. |
| 44c | 130-135 | 10-15 | 3½ | ----do---- | ----do---- | Soluble. |
| 45c | 130-135 | 10-15 | 4 | ----do---- | ----do---- | Do. |
| 46c | 130-135 | 10-15 | 4 | ----do---- | ----do---- | Do. |
| 47c | 130-135 | 10-15 | 4 | ----do---- | ----do---- | Do. |
| 48c | 130-135 | 10-15 | 5 | ----do---- | ----do---- | Do. |
| 49c | 125-130 | 5-10 | 1 | ----do---- | ----do---- | Insoluble. |
| 50c | 125-130 | 5-10 | 1½ | ----do---- | ----do---- | Do. |
| 51c | 125-130 | 5-10 | 1½ | ----do---- | ----do---- | Dispersible. |
| 52c | 125-130 | 5-10 | 2 | ----do---- | ----do---- | Soluble. |
| 53c | 125-130 | 5-10 | 3 | ----do---- | ----do---- | Do. |
| 54c | 125-130 | 5-10 | 3 | ----do---- | ----do---- | Do. |
| 55c | 125-130 | 5-10 | 3½ | ----do---- | ----do---- | Do. |
| 56c | 125-130 | 5-10 | 4 | ----do---- | ----do---- | Do. |
| 57c | 125-130 | 5-10 | 1 | ----do---- | ----do---- | Insoluble. |
| 58c | 125-130 | 5-10 | 1½ | ----do---- | ----do---- | Do. |
| 59c | 125-130 | 5-10 | 1½ | ----do---- | ----do---- | Dispersible. |
| 60c | 125-130 | 5-10 | 1¾ | ----do---- | ----do---- | Soluble. |
| 61c | 125-130 | 5-10 | 2 | ----do---- | ----do---- | Do. |
| 62c | 125-130 | 5-10 | 3 | ----do---- | ----do---- | Do. |
| 63c | 125-130 | 5-10 | 4 | ----do---- | ----do---- | Do. |
| 64c | 125-130 | 5-10 | 5 | ----do---- | ----do---- | Do. |
| 65c | 125-130 | 10-15 | 1½ | ----do---- | ----do---- | Insoluble. |
| 66c | 125-130 | 10-15 | 2 | ----do---- | ----do---- | Do. |
| 67c | 125-130 | 10-15 | 2 | ----do---- | ----do---- | Dispersible. |
| 68c | 125-130 | 10-15 | 3 | ----do---- | ----do---- | Do. |
| 69c | 125-130 | 10-15 | 5 | ----do---- | ----do---- | Soluble. |
| 70c | 125-130 | 10-15 | 3 | ----do---- | ----do---- | Do. |
| 71c | 125-130 | 10-15 | 3½ | ----do---- | ----do---- | Do. |
| 72c | 125-130 | 10-15 | 4 | ----do---- | ----do---- | Do. |
| 73c | 125-130 | 15-20 | 1 | ----do---- | ----do---- | Insoluble. |
| 74c | 125-130 | 15-20 | 1¼ | ----do---- | ----do---- | Do. |
| 75c | 125-130 | 15-20 | 1¾ | ----do---- | ----do---- | Do. |
| 76c | 125-130 | 15-20 | 2½ | ----do---- | ----do---- | Dispersible. |
| 77c | 125-130 | 15-20 | 3 | ----do---- | ----do---- | Do. |
| 78c | 125-130 | 15-20 | 4 | ----do---- | ----do---- | Soluble. |
| 79c | 125-130 | 15-20 | 3½ | ----do---- | ----do---- | Do. |
| 80c | 125-130 | 15-20 | 5 | ----do---- | ----do---- | Do. |
| 1d | 125-130 | 15-20 | 2 | Emulsifiable | ----do---- | Insoluble. |
| 2d | 125-130 | 15-20 | 2½ | ----do---- | ----do---- | Do. |
| 3d | 125-130 | 15-20 | 3 | ----do---- | ----do---- | Do. |
| 4d | 125-130 | 15-20 | 4 | Insoluble | ----do---- | Do. |

TABLE VI—Continued

| Ex. No. | Max. temp., °C. | Max. pres., p. s. i. | Time, hrs. | Solubility | | |
|---|---|---|---|---|---|---|
| | | | | Water | Xylene | Kerosene |
| 5d | 125-130 | 15-20 | 2¼ | ----do------- | ----do------- | Do. |
| 6d | 125-130 | 15-20 | 2½ | ----do------- | ----do------- | Do. |
| 7d | 125-130 | 15-20 | 3 | ----do------- | ----do------- | Do. |
| 8d | 125-130 | 15-20 | 3½ | ----do------- | ----do------- | Do. |
| 9d | 125-135 | 20-25 | ½ | Soluble------- | ----do------- | Do. |
| 10d | 125-135 | 20-25 | 1 | ----do------- | ----do------- | Do. |
| 11d | 125-135 | 20-25 | 1¼ | Emulsifiable | ----do------- | Do. |
| 12d | 125-135 | 20-25 | 2½ | ----do------- | ----do------- | Do. |
| 13d | 125-135 | 20-25 | 3 | ----do------- | ----do------- | Do. |
| 14d | 125-135 | 20-25 | 4 | Emulsifiable to insoluble. | ----do------- | Do. |
| 15d | 125-135 | 20-25 | 4 | ----do------- | ----do------- | Do. |
| 16d | 125-135 | 20-25 | 5 | Insoluble------ | ----do------- | Do. |
| 17d | 130-135 | 20-25 | ½ | ----do------- | ----do------- | Soluble. |
| 18d | 130-135 | 20-25 | ½ | ----do------- | ----do------- | Do. |
| 19d | 130-135 | 20-25 | ½ | ----do------- | ----do------- | Do. |
| 20d | 130-135 | 20-25 | ¾ | Emulsifiable | ----do------- | Do. |
| 21d | 130-135 | 20-25 | 1½ | ----do------- | ----do------- | Do. |
| 22d | 130-135 | 20-25 | 2¾ | ----do------- | ----do------- | Do. |
| 23d | 130-135 | 20-25 | 3½ | ----do------- | ----do------- | Do. |
| 24d | 130-135 | 20-25 | 4 | Soluble------- | ----do------- | Do. |
| 25d | 125-130 | 20-30 | ½ | Insoluble------ | ----do------- | Do. |
| 26d | 125-130 | 20-30 | ½ | ----do------- | ----do------- | Do. |
| 27d | 125-130 | 20-30 | 1 | Emulsifiable | ----do------- | Dispersible. |
| 28d | 125-130 | 20-30 | 1¾ | ----do------- | ----do------- | Insoluble. |
| 29d | 125-130 | 20-30 | 2 | ----do------- | ----do------- | Do. |
| 30d | 125-130 | 20-30 | 3 | ----do------- | ----do------- | Do. |
| 31d | 125-130 | 20-30 | 4½ | Emulsifiable to soluble. | ----do------- | Do. |
| 32d | 125-130 | 20-30 | 5 | Soluble------- | ----do------- | Do. |

PART 6

The conversion of the oxyalkylated basic condensates of the kind previously described into the corresponding salt of gluconic acid is a simple operation since it is nothing more nor less than neutralization. The condensate invariably contains two basic nitrogen atoms. One can neutralize either one or both nitrogen atoms.

Another factor which requires some consideration would be the presence of basic catalysts which were used during the oxyalkylation process. Actual tests indicate that the basicity appears to be somewhat less than would be expected, particularly in examples in which oxyalkylation is comparatively high. The usual procedure has been to add enough gluconic acid to convert the product into the salt as predetermined and then note whether or not the product showed any marked alkalinity. If so, slightly more gluconic acid was added until the product was either just barely acid or just very moderately alkaline. For sake of clarity this added amount of gluconic acid, if required, is ignored in the subsequent Table No. VIII.

Gluconic acid is available as a 50% solution. Dehydration causes decomposition. This is not true of the salts or, at least, the salts of the herein described oxyalkylated condensates. Such salts appear to be stable, or stable for all practical purposes, at least at a temperature slightly above the boiling point of water and perhaps at a temperature as high as 150° C. or thereabouts.

As has been pointed out previously the present application is a continuation-in-part of certain co-pending applications and reference is made to aforementioned copending application, Serial No. 329,482, filed January 2, 1953. The co-pending application, Serial No. 329,482, filed January 2, 1953, describes the neutralization of the non-oxyalkylated condensate. Reference now is made to Table VII which, in essence, is substantially the same as much of the data in Table II but includes additional calculations showing the amount of gluconic acid (50%) required to neutralize a certain amount of condensate for instance, compare Example 1e in Table VII with Example 1b in Table II. In any event since there were available various oxyalkylated derivatives of condensates 1b, 5b, 7b, and 11b these particular oxyalkylated derivatives were used for the purpose of illustrating a salt formation, all of which is illustrated in Table VIII.

Briefly stated, referring to Table VIII it is to be noted that 1052 grams of the nonoxyalkylated condensate required 780 grams of 50% gluconic acid for neutralization. Reference to Table VIII shows that 1052 grams of the condensate 1b when converted into an oxyalkylated derivative as obtained from Example 3c were the equivalent of 5100 grams. Therefore, 5100 grams was ordinarily selected as the appropriate amount of oxyalkylated material for neutralization simply for the reason that calculation was eliminated.

The oxyalkylated condensate generally is a liquid and, as a rule, contains a comparatively small amount of solvent. Note the examples in Table VIII. The solvent happened to be xylene in this instance but could have been benzene, aromatic petroleum solvent, or the like. Needless to say, the solvent could have been removed from the oxyalkylated derivative by use of vacuum distillation and this is particularly true if benzene happened to be the solvent. The product obtained from oxyalkylation is invariably lighter than the initial material for the reason that the condensate is dark colored and oxyalkylation simply dilutes the color. In other words, the product may be almost white, pale straw color or an amber shade with a reddish tint.

The product either before or after neutralization can be bleached with filtering clays, charcoals, etc. The procedure generally is, as a matter of convenience, to form the salt and then dilute with a solvent if desired, using such solvent as xylene or a mixture of two-thirds xylene and one-third ethyl alcohol or isopropyl alcohol, to give approximately a 50% solution. If there happened to be any precipitate the solution is filtered. If desired, the product prior to dilution could be rendered anhydrous simply by adding benzene and subjecting the mixture to reflux action under a condensate or a phase-separating trap. If there happened to be any tendency for the product to separate then the solvents having hydrotropic properties, such as the diethylether of ethyleneglycol, or the like, are used.

The salt formation is merely a matter of agitation at room temperature, or at a somewhat higher temperature if desired, particularly in a reflux condenser. Usually agitation is continued for an hour but actually neutralization may be a matter of minutes. In some instances after salt formtaion is complete and the product is diluted to approximately 50%, I have permitted the solution to stand for about 6 to 72 hours. Sometimes, depending on composition, there is a separation of an aqueous phase or a small amount of salt-like material. On a laboratory scale the procedure is conducted in a separatory funnel. If there is separation of an aqueous phase, or any other undesirable material, at the bottom of the separatory funnel it is merely discarded. The salt form, of course, can be bleached in the same manner as previously described for the oxyalkylated derivative. Usually the color of the salt is practically the same as the oxyalkylated derivative. For various commercial purposes in which the product is used there is no justification for the added cost of decolorization. The salt form can be dehydrated or rendered solvent-free by the usual procedure, i. e., vacuum distillation, after the use of a phase-separating trap.

The product as prepared, without attempting to decolorize, eliminate any residual catalyst in the form of a salt, and without any particular effort to obtain absolute neutrality or the equivalent, is more than satisfactory for a number of purposes where the material is useful, such as application as a demulsifier for petroleum emulsions of the water-in-oil type, or oil-in-water type; or in the prevention of corrosion of metallic surfaces, especially ferrous surfaces; or as an asphalt additive for anti-stripping purposes.

The condensates prior to oxyalkylation may be solids but are generally viscous liquids or liquids which are almost solid or tacky. Oxyalkylation reduces such materials to viscous liquids or thin liquids comparable to polyglycols, of course depending primarily on the amount of alkaline oxide added. After neutralization the physical characteristics of the products are about the same and in the majority of cases are liquids. Needless to say, if a solvent were added, even if the material were solid initially, it would be converted into a liquid form.

In light of what has been said and the simplicity of salt formation it does not appear that any illustration is required. However, previous reference has been made to Table VIII. The first example in Table VIII is Example 1f. The following is more specific data in regard to Example 1f.

Example 1f

The salt was made from oxyalkylated derivative Example 3c. Oxyalkylated derivative 3c, in turn, was made from condensate Example 1b. Condensate Example 1b, in turn, was made from resin Example 2a and diethylamine. 882 grams of the resin dissolved in an equal weight of xylene were reacted with 146 grams of diethylamine and 162 grams of 37% formaldehyde. All this has been described previously. The weight of the condensate on a solvent-free basis was 1052 grams. This represented approximately 27.8 grams of basic nitrogen. Referring to Table VIII it will be noted that 10.56 pounds of condensate 1b were combined with 31.68 pounds of ethylene oxide in combination 8.8 pounds of solvent. In any event, 5100 grams of oxyalkylated derivative 3c were placed in a laboratory device which, although made of metal, was the equivalent of a separatory funnel. To this there was added 780 grams of gluconic acid and the mixture stirred vigorously for an hour and allowed to stand at room temperature, or slightly above, for approximately 3 days. The slight amount of dregs at the bottom were withdrawn and the material was stored as such although ultimately it was diluted to approximately 50% with xylene and employed in the form of a 50% solution. A number of other examples are included in Table VIII.

For convenience, Table VII is included at this point just preceding Table VIII.

TABLE VII

| Salt Ex. No. | Salt from condensate No. | Condensate in turn derived from— | | | | | | | Salt formation calculated on basis of non-oxyalkylated condensate | | |
|---|---|---|---|---|---|---|---|---|---|---|---|
| | | Resin No. | Amt. resin, gms. | Solvent | Amt. solvent, gms. | Amine used | Amine used, gms. | 37% formaldehyde, gms. | Wt. of condensate on solvent-free basis, gms. | Theo. basic nitrogen, gms. | 50% gluconic acid, gms. |
| 1e | 1b | 2a | 882 | Xylene | 882 | Diethylamine | 146 | 162 | 1,052 | 27.8 | 780 |
| 2e | 2b | 5a | 480 | ...do | 480 | ...do | 73 | 81 | 565 | 13.9 | 390 |
| 3e | 3b | 10a | 633 | ...do | 633 | ...do | 73 | *100 | 718 | 13.9 | 390 |
| 4e | 4b | 2a | 441 | ...do | 441 | Dibutylamine | 129 | 81 | 582 | 14.0 | 390 |
| 5e | 5b | 5a | 480 | ...do | 480 | ...do | 129 | 81 | 621 | 14.0 | 390 |
| 6e | 6b | 10a | 633 | ...do | 633 | ...do | 129 | 81 | 774 | 14.0 | 390 |
| 7e | 7b | 2a | 882 | ...do | 882 | Morpholine | 174 | 162 | 1,080 | 28.0 | 780 |
| 8e | 8b | 5a | 480 | ...do | 480 | ...do | 87 | 81 | 579 | 14.0 | 390 |
| 9e | 9b | 10a | 633 | ...do | 633 | ...do | 87 | 81 | 732 | 14.0 | 390 |
| 10e | 10b | 13a | 473 | ...do | 473 | Dioctylamine | 117 | *100 | 602 | 6.8 | 190 |
| 11e | 11b | 14a | 511 | ...do | 511 | ...do | 117 | *100 | 640 | 6.8 | 190 |
| 12e | 12b | 15a | 651 | ...do | 665 | ...do | 117 | 81 | 794 | 6.8 | 190 |
| 13e | 1b | 2a | 882 | ...do | 882 | Diethylamine | 146 | 162 | 1,052 | 27.8 | 390 |
| 14e | 4b | 2a | 441 | ...do | 441 | Dibutylamine | 129 | 81 | 582 | 14.0 | 195 |
| 15e | 7b | 2a | 882 | ...do | 882 | Morpholine | 174 | 162 | 1,020 | 28.0 | 390 |

*30% sol.

TABLE VIII

| Ex. No. | Oxyalkylated derivative, ex. No. | Obtained in turn from— | | | | | Percent condensate in oxyalkylated derivative | Grams of oxyalkylated compound which is equiv. to grams of condensate | | 50 percent gluconic acid to neutralize, grams |
|---|---|---|---|---|---|---|---|---|---|---|
| | | Condensate, ex. No. | Amt. condensate, lbs. | EtO amt., lbs. | PrO amt., lbs. | Solvent amt., lbs. | | Oxyalkylated compound | Condensate | |
| 1f | 3c | 1b | 10.56 | 31.68 | | 8.8 | 20.6 | 5,100 | 1,052 | 780 |
| 2f | 4c | 1b | 10.56 | 42.24 | | 8.8 | 17.3 | 6,100 | 1,052 | 780 |
| 3f | 5c | 1b | 10.56 | 52.80 | | 8.8 | 14.6 | 7,250 | 1,052 | 780 |
| 4f | 13c | 5b | 12.56 | 62.80 | | 9.6 | 14.8 | 4,200 | 621 | 390 |
| 5f | 14c | 5b | 12.56 | 75.36 | | 9.6 | 12.8 | 4,850 | 621 | 390 |
| 6f | 15c | 5b | 12.56 | 87.92 | | 9.6 | 11.4 | 5,425 | 621 | 390 |
| 7f | 62c | 7b | 10.84 | | 75.88 | 8.8 | 12.7 | 8,500 | 1,080 | 780 |
| 8f | 63c | 7b | 10.84 | | 97.56 | 8.8 | 9.3 | 11,600 | 1,080 | 780 |
| 9f | 64c | 7b | 10.84 | | 119.24 | 8.8 | 7.8 | 13,850 | 1,080 | 780 |
| 10f | 68c | 11b | 12.84 | | 51.36 | 10.2 | 17.3 | 3,700 | 640 | 190 |
| 11f | 69c | 11b | 12.84 | | 64.20 | 10.2 | 14.7 | 4,350 | 640 | 190 |
| 12f | 70c | 11b | 12.84 | | 89.88 | 10.2 | 11.4 | 5,600 | 640 | 190 |
| 13f | 4d | 1b | 10.56 | 15.84 | 21.12 | 8.8 | 18.8 | 5,600 | 1,052 | 780 |
| 14f | 5d | 1b | 10.56 | 15.84 | 26.40 | 8.8 | 17.2 | 6,125 | 1,052 | 780 |
| 15f | 6d | 1b | 10.56 | 15.84 | 31.68 | 8.8 | 15.8 | 6,675 | 1,052 | 780 |
| 16f | 22d | 5b | 12.56 | 56.52 | 62.80 | 9.6 | 8.9 | 7,000 | 621 | 390 |
| 17f | 23d | 5b | 12.56 | 69.08 | 62.80 | 9.6 | 8.2 | 7,550 | 621 | 390 |
| 18f | 24d | 5b | 12.56 | 81.64 | 62.80 | 9.6 | 7.5 | 8,300 | 621 | 390 |

PART 7

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleum, etc., may be employed as diluents. Similarly, the material or materials employed as the demulsifying agent of my process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil-solubility. However, since such reagents are frequently used in a ratio of 1 to 10,000 or 1 to 20,000, or 1 to 30,000, or even 1 to 40,000, or 1 to 50,000 as in desalting practice, such an apparent insolubility in oil and water is not significant because said reagents undoubtedly have solubility within such concentrations. This same fact is true in regard to the material or materials employed as the demulsifying agent of my process.

In practicing the present process, the treating or demulsifying agent is used in the conventional way, well known to the art, described, for example, in Patent 2,626,929, dated January 27, 1953, Part 3, and reference is made thereto for a description of conventional procedures of demulsifying, including batch, continuous, and down-the-hole demulsification, the process essentially involving introducing a small amount of demulsifier into a large amount of emulsion with adequate admixture with or without the application of heat, and allowing the mixture to stratify.

As noted above, the products herein described may be used not only in diluted form, but also may be used admixed with some other chemical demulsifier. A mixture which illustrates such combination is the following:

Oxyalkylated derivative, for example, the product of Example 13f, 20%;
A cyclohexylamine salt of a polypropylated napthalene monosulfonic acid, 24%;
An ammonium salt of a polypropylated napthalene monosulfonic acid, 24%;
A sodium salt of oil-soluble mahogany petroleum sulfonic acid, 12%;
A high-boiling aromatic petroleum solvent, 15%;
Isopropyl alcohol, 5%.

The above proportions are all weight percents.

Having thus described my invention, what I claim as new and desire to obtain by Letters Patent, is:

1. A process for breaking petroleum emulsions of the water-in-oil type characterized by subjecting the emulsion to the action of a demulsifier including the gluconic acid salts of the basic oxyalkylated products obtained in turn in the process of condensing (a) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of trifunctional phenols; said phenol being of the formula

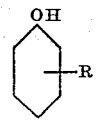

in which R is an aliphatic hydrocarbon radical having at least 4 and not more than 24 carbon atoms and substituted in the 2,4,6 position; (b) a basic nonhydroxylated secondary monoamine having not more than 32 carbon atoms in any group attached to the amino nitrogen atom, and (c) formaldehyde; said condensation reaction being conducted at a temperature sufficiently high to eliminate water and below the pyrolytic point of the reactants and resultants of reaction; and with the proviso that the resinous condensation product resulting from the process be heat-stable and oxyalkylation-susceptible; followed by an oxyalkylation step by means of an alpha-beta alkylene oxide having not more than 4 carbon atoms and selected from the class consisting of ethylene oxide, propylene oxide, butylene oxide, glycide and methylglycide.

2. A process for breaking petroleum emulsions of the water-in-oil type characterized by subjecting the emulsion to the action of a demulsifier including the gluconic acid salts of the basic oxyalkylated products obtained in turn in the process of condensing (a) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei per resin molecular; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of trifunctional phenols; said phenol being of the formula

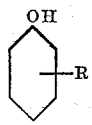

in which R is an aliphatic hydrocarbon radical having at least 4 and not more than 24 carbon atoms and substituted in the 2,4,6 position; (b) a basic nonhydroxylated secondary monoamine having not more than 32 carbon atoms in any group attached to the amino nitrogen atom, and (c) formaldehyde; said condensation reaction being conducted at a temperature sufficiently high to eliminate water and below the pyrolytic point of the reactants and resultants of reaction; with the added proviso that the condensation reaction be conducted so as to produce a significant portion of the resultant in which each of the three reactants have contributed part of the ultimate molecule; and with the further proviso that the resinous condensation product resulting from the process be heat-stable and oxyalkylation-susceptible, followed by an oxyalkylation step by means of an alpha-beta alkylene oxide having not more than 4 carbon atoms and selected from the class consisting of ethylene oxide, propylene oxide, butylene oxide, glycide and methylglycide.

3. A process for breaking petroleum emulsions of the water-in-oil type characterized by subjecting the emulsion to the action of a demulsifier including the gluconic acid salts of the basic oxyalkylated products obtained in turn in the process of condensing (a) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of trifunctional phenols; said phenol being of the formula

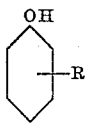

in which R is an aliphatic hydrocarbon radical having at least 4 and not more than 24 carbon atoms and substituted in the 2,4,6 position; (b) a basic nonhydroxylated secondary monoamine having not more than 32 carbon atoms in any group attached to the amino nitrogen atom; and (c) formaldehyde; said condensation reaction being conducted at a temperature sufficiently high to eliminate water and below the pyrolytic point of the reactants and resultants of reaction, with the proviso that the condensation reaction be conducted so as to produce a significant portion of the resultant in which each of the three reactants have contributed part of the ultimate molecule by virtue of a formaldehyde-derived methylene bridge connecting the amino nitrogen atom with a resin molecule; and with the further proviso that the resinous condensation product resulting from the process be heat-stable and oxyalkylation-susceptible; followed by an oxyalkylation step by means of an alpha-beta alkylene oxide having not more than 4 carbon atoms and selected from the class consisting of ethylene oxide, propylene oxide, butylene oxide, glycide and methylglycide.

4. A process for breaking petroleum emulsions of the water-in-oil type characterized by subjecting the emulsion to the action of a demulsifier including the gluconic acid salts of the basic oxyalkylated products obtained in turn in the process of condensing (a) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of trifunctional phenols; said phenol being of the formula

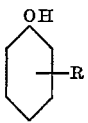

in which R is an aliphatic hydrocarbon radical having at least 4 and not more than 24 carbon atoms and substituted in the 2,4,6 position; (b) a basic nonhydroxylated secondary monoamine having not more than 32 carbon atoms in any group attached to the amino nitrogen atom, and (c) formaldehyde; said condensation reaction being conducted at a temperature sufficiently high to eliminate water and below the pyrolytic point of the reactants and resultants of reaction; with the proviso that the condensation reaction be conducted so as to produce a significant portion of the resultant in which each of the three reactants have contributed part of the ultimate molecule by virtue of a formaldehyde-derived methylene bridge connecting the amino nitrogen atom with a resin molecule; with the further proviso that the molar ratio of reactants be approximately 1,2 and 2 respectively; and with the final proviso that the resinous condensation product resulting from the process be heat-stable and oxyalkylation-susceptible; followed by an oxyalkylation step by means of an alpha-beta alkylene oxide having not more than 4 carbon atoms and selected from the class consisting of ethylene oxide, propylene oxide, butylene oxide, glycide and methylglycide.

5. A process for breaking petroleum emulsions of the water-in-oil type characterized by subjecting the emulsion to the action of a demulsifier including the gluconic acid salts of the basic oxyalkylated products obtained in turn in the process of condensing (a) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of trifunctional phenols; said phenol being of the formula

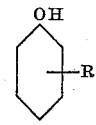

in which R is an aliphatic hydrocarbon radical having at least 4 and not more than 24 carbon atoms and substituted in the 2,4,6 position; (b) a basic nonhydroxylated secondary monoamine having not more than 32 carbon atoms in any group attached to the amino nitrogen atom, and (c) formaldehyde; said condensation reaction being conducted at a temperature sufficiently high to eliminate water and below the pyrolytic point of the reactants and resultants of reaction, with the proviso that the condensation reaction be conducted so as to produce a significant portion of the resultant in which each of the three reactants have contributed part of the ultimate molecule by virtue of a formaldehyde-derived methylene bridge connecting the amino nitrogen atom with a resin molecule; with the added proviso that the molar ratio of reactants be approximately 1,2 and 2, respectively; with the further proviso that said procedure involve the use of a solvent; and with the final proviso that the resinous condensation product resulting from the process be heat-stable and oxyalkylation-susceptible; followed by an oxyalkylation step by means of an alpha-beta alkylene oxide having not more than 4 carbon atoms and selected from the class consisting of ethylene oxide, propylene oxide, butylene oxide, glycide and methylglycide.

6. A process for breaking petroleum emulsions of the water-in-oil type characterized by subjecting the emulsion to the action of a demulsifier including the gluconic acid salts of the basic oxyalkylated products obtained in turn in the process of condensing (a) an oxyethylation-susceptible, fusible, non-oxygenated organic solvent-soluble, water-insoluble, low-stage phenol-formaldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and formaldehyde; said resin being formed in the substantial absence of trifunctional phenols; said phenol being of the formula

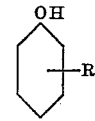

in which R is an aliphatic hydrocarbon radical having at least 4 and not more than 24 carbon atoms and substituted in the 2,4,6 position; (b) a basic nonhydroxylated secondary monoamine having not more than 32 carbon atoms in any group attached to the amino nitrogen atom, and (c) formaldehyde; said condensation reaction being conducted at a temperature sufficiently high to eliminate water and below the pyrolytic point of the reactants and resultants of reaction, with the proviso that the condensation reaction be conducted so as to produce a significant portion of the resultant in which each of the three reactants have contributed part of the ultimate molecule by virtue of a formaldehyde-derived methylene bridge connecting the amino nitrogen atom with a resin molecule; with the added proviso that the molar ratio of reactants be approximately 1,2 and 2, respectively; with the further proviso that said procedure involve the use of a solvent; and with the final proviso that the resinous condensation product resulting from the process be heat-stable and oxyalkylation-susceptible; followed by an oxyalkylation step by means of an alpha-beta alkylene oxide having not more than 4 carbon atoms and selected from the class consisting of ethylene oxide, propylene oxide, butylene oxide, glycide and methylglycide.

7. A process for breaking petroleum emulsions of the water-in-oil type characterized by subjecting the emulsion to the action of a demulsifier including the gluconic acid salts of the basic oxyalkylated products obtained in turn in the process of condensing (a) an oxyethylation-susceptible, fusible, non-oxygenated organic solvent-soluble, water-insoluble, low-stage phenol-formaldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and formaldehyde; said resin being formed in the substantial absence of trifunctional phenols; said phenol being of the formula

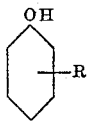

in which R is an aliphatic hydrocarbon radical having at least 4 and not more than 14 carbon atoms and substituted in the 2,4,6 position; (b) a basic nonhydroxylated secondary monoamine having not more than 32 carbon atoms in any group attached to the amino nitrogen atom, and (c) formaldehyde; said condensation reaction being conducted at a temperature sufficiently high to eliminate water and below the pyrolytic point of the reactants and resultants of reaction, with the proviso that the condensation reaction be conducted so as to produce a significant portion of the resultant in which each of the three reactants have contributed part of the ultimate molecule by virtue of a formaldehyde-derived methylene bridge connecting the amino nitrogen atom with a resin molecule; with the added proviso that the molar ratio of reactants be approximately 1,2 and 2, respectively; with the further proviso that said procedure involve the use of a solvent; and with the final proviso that the resinous condensation product resulting from the process be heat-stable and oxyalkylation-susceptible; followed by an oxyalkylation step by means of an alpha-beta alkylene oxide having not more than 4 carbon atoms and selected from the class consisting of ethylene oxide, propylene oxide, butylene oxide, glycide and methylglycide.

8. A process for breaking petroleum emulsions of the water-in-oil type characterized by subjecting the emulsion to the action of a demulsifier including the gluconic acid salts of the basic oxyalkylated products obtained in turn in the process of condensing (a) an oxyethylation-susceptible, fusible, non-oxygenated organic solvent-soluble, water-insoluble, low-stage phenol-formaldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and formaldehyde; said resin being formed in the substantial absence of trifunctional phenols; said phenol being of the formula

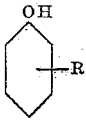

in which R is an aliphatic hydrocarbon radical having at least 4 and not more than 14 carbon atoms and substituted in the 2,4,6 position; (b) a basic nonhydroxylated secondary monoamine having not more than 32 carbon atoms in any group attached to the amino nitrogen atom, and (c) formaldehyde; said condensation reaction being conducted at a temperature above the boiling point of water and below 150° C., with the proviso that the condensation reaction be conducted so as to produce a significant portion of the resultant in which each of the three reactants have contributed part of the ultimate molecule by virtue of a formaldehyde-derived methylene bridge connecting the amino nitrogen atom with a resin molecule; with the added proviso that the molar ratio of reactants be approximately 1,2 and 2, respectively; with the further proviso that said procedure involve the use of a solvent; and with the final proviso that the resinous condensation product resulting from the process be heat-stable and oxyalkylation-susceptible; followed by an oxyalkylation step by means of an alpha-beta alkylene oxide having not more than 4 carbon atoms and selected from the class consisting of ethylene oxide, propylene oxide, butylene oxide, glycide and methylglycide.

9. A proces for breaking petroleum emulsions of the water-in-oil type characterized by subjecting the emulsion to the action of a demulsifier including the gluconic acid salts of the basic oxyalkylated products obtained in turn in the process of condensing (a) an oxyethylation-susceptible, fusible, non-oxygenated organic solvent-soluble, water-insoluble, low-stage phenol-formaldehyde resin having an average molecular weight corresponding to at least 3 and not over 5 phenolic nuclei per resin molecule; said resin being difunctional only in regard to methylol-forming reactivity; said resin being derived by reaction between a difunctional monohydric phenol and formaldehyde; said resin being formed in the susbtantial absence of trifunctional phenols; said phenol being of the formula

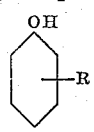

in which R is a para-substituted aliphatic hydrocarbon radical having at least 4 and not more than 14 carbon atoms; (b) a basic nonhydroxylated secondary monoamine having not more than 32 carbon atoms in any group attached to the amino nitrogen atom, and (c) formaldehyde; said condensation reaction being conducted at a temperature above the boiling point of water and below 150° C., with the proviso that the condensation reaction be conducted so as to produce a significant portion of the resultant in which each of the three reactants have contributed part of the ultimate molecule by virtue of a formaldehyde-derived methylene bridge connecting the amino nitrogen atom with a resin molecule; with the added proviso that the molar ratio of reactants be approximately 1,2 and 2, respectively; with the further proviso that said procedure involve the use of a solvent; and with the final proviso that the resinous condensation product resulting from the process be heat-stable and oxyalkylation-susceptible; followed by an oxyalkylation step by means of an alpha-beta alkylene oxide having not more than 4 carbon atoms and selected from the class consisting of ethylene oxide, propylene oxide, butylene oxide, glycide and methylglycide.

10. The process of breaking petroleum emulsions as defined in claim 1 wherein the oxyalkylation step of the manufacturing process is limited to the use of both ethylene oxide and propylene oxide in combination.

11. The process of breaking petroleum emulsions as defined in claim 2 wherein the oxyalkylation step of the manufacturing process is limited to the use of both ethylene oxide and propylene oxide in combination.

12. The process of breaking petroleum emulsions as defined in claim 3 wherein the oxyalkylation step of the manufacturing process is limited to the use of both ethylene oxide and propylene oxide in combination.

13. The process of breaking petroleum emulsions as defined in claim 4 wherein the oxyalkylation step of the manufacturing process is limited to the use of both ethylene oxide and propylene oxide in combination.

14. The process of breaking petroleum emulsions as defined in claim 5 wherein the oxyalkylation step of the manufacturing process is limited to the use of both ethylene oxide and propylene oxide in combination.

15. The process of breaking petroleum emulsions as defined in claim 6 wherein the oxyalkylation step of the manufacturing process is limited to the use of both ethylene oxide and propylene oxide in combination.

16. The process of breaking petroleum emulsions as defined in claim 7 wherein the oxyalkylation step of the manufacturing process is limited to the use of both ethylene oxide and propylene oxide in combination.

17. The process of breaking petroleum emulsions as defined in claim 8 wherein the oxyalkylation step of the manufacturing process is limited to the use of both ethylene oxide and propylene oxide in combination.

18. The process of breaking petroleum emulsions as defined in claim 9 wherein the oxyalkylation step of the manufacturing process is limited to the use of both ethylene oxide and propylene oxide in combination.

19. The process of claim 1 with the proviso that the hydrophile properties of the gluconic acid salt of the oxyalkylated condensation product in an equal weight of xylene are sufficient to produce an emulsion when said xylene solution is shaken vigorously with one to three volumes of water.

20. The process of claim 2 with the proviso that the hydrophile properties of the gluconic acid salt of the oxyalkylated condensation product in an equal weight of xylene are sufficient to produce an emulsion when said xylene solution is shaken vigorously with one to three volumes of water.

21. The process of claim 3 with the proviso that the hydrophile properties of the gluconic acid salt of the oxyalkylated condensation product in an equal weight of xylene are sufficient to produce an emulsion when said xylene solution is shaken vigorously with one to three volumes of water.

22. The process of claim 4 with the proviso that the hydrophile properties of the gluconic acid salt of the oxyalkylated condensation product in an equal weight of xylene are sufficient to produce an emulsion when said xylene solution is shaken vigorously with one to three volumes of water.

23. The process of claim 5 with the proviso that the hydrophile properties of the gluconic acid salt of the oxyalkylated condensation product in an equal weight of xylene are sufficient to produce an emulsion when said xylene solution is shaken vigorously with one to three volumes of water.

24. The process of claim 6 with the proviso that the hydrophile properties of the gluconic acid salt of the oxyalkylated condensation product in an equal weight of xylene are sufficient to produce an emulsion when said xylene solution is shaken vigorously with one to three volumes of water.

25. The process of claim 7 with the proviso that the hydrophile properties of the gluconic acid salt of the oxyalkylated condensation product in an equal weight of xylene are sufficient to produce an emulsion when said xylene solution is shaken vigorously with one to three volumes of water.

26. The process of claim 8 with the proviso that the hydrophile properties of the gluconic acid salt of the oxyalkylated condensation product in an equal weight of xylene are sufficient to produce an emulsion when said xylene solution is shaken vigorously with one to three volumes of water.

27. The process of claim 9 with the proviso that the hydrophile properties of the gluconic acid salt of the oxyalkylated condensation product in an equal weight of xylene are sufficient to produce an emulsion when said xylene solution is shaken vigorously with one to three volumes of water.

28. The process of claim 10 with the proviso that the hydrophile properties of the gluconic acid salt of the oxyalkylated condensation product in an equal weight of xylene are sufficient to produce an emulsion when said xylene solution is shaken vigorously with one to three volumes of water.

29. The process of claim 11 with the proviso that the hydrophile properties of the gluconic acid salt of the oxyalkylated condensation product in an equal weight of xylene are sufficient to produce an emulsion when said xylene solution is shaken vigorously with one to three volumes of water.

30. The process of claim 12 with the proviso that the hydrophile properties of the gluconic acid salt of the oxyalkylated condensation product in an equal weight of xylene are sufficient to produce an emulsion when said xylene solution is shaken vigorously with one to three volumes of water.

31. The process of claim 13 with the proviso that the hydrophile properties of the gluconic acid salt of the oxyalkylated condensation product in an equal weight of xylene are sufficient to produce an emulsion when said xylene solution is shaken vigorously with one to three volumes of water.

32. The process of claim 14 with the proviso that the hydrophile properties of the gluconic acid salt of the oxyalkylated condensation product in an equal weight of xylene are sufficient to produce an emulsion when said xylene solution is shaken vigorously with one to three volumes of water.

33. The process of claim 15 with the proviso that the hydrophile properties of the gluconic acid salt of the oxyalkylated condensation product in an equal weight of xylene are sufficient to produce an emulsion when said xylene solution is shaken vigorously with one to three volumes of water.

34. The process of claim 16 with the proviso that the hydrophile properties of the gluconic acid salt of the oxyalkylated condensation product in an equal weight of xylene are sufficient to produce an emulsion when said xylene solution is shaken vigorously with one to three volumes of water.

35. The process of claim 17 with the proviso that the hydrophile properties of the gluconic acid salt of the oxyalkylated condensation product in an equal weight of xylene are sufficient to produce an emulsion when said xylene solution is shaken vigorously with one to three volumes of water.

36. The process of claim 18 with the proviso that the hydrophile properties of the gluconic acid salt of the oxyalkylated condensation product in an equal weight of xylene are sufficient to produce an emulsion when said xylene solution is shaken vigorously with one to three volumes of water.

References Cited in the file of this patent

UNITED STATES PATENTS

| Number | Name | Date |
|---|---|---|
| 2,031,557 | Bruson | Feb. 18, 1936 |
| 2,499,365 | De Groote et al. | Mar. 7, 1950 |
| 2,535,380 | Adams et al. | Dec. 26, 1950 |
| 2,542,001 | De Groote et al. | Feb. 20, 1951 |
| 2,545,692 | Gleim | Mar. 20, 1951 |
| 2,568,739 | Kirkpatrick et al. | Sept. 25, 1951 |
| 2,679,484 | De Groote | May 25, 1954 |
| 2,695,887 | De Groote | Nov. 30, 1954 |